(12) United States Patent
Choe et al.

(10) Patent No.: US 11,801,861 B2
(45) Date of Patent: Oct. 31, 2023

(54) USING IMAGE AUGMENTATION WITH SIMULATED OBJECTS FOR TRAINING MACHINE LEARNING MODELS IN AUTONOMOUS DRIVING APPLICATIONS

(71) Applicant: NVIDIA Corporation, Santa Clara, CA (US)

(72) Inventors: Tae Eun Choe, Belmont, CA (US); Pengfei Hao, San Jose, CA (US); Xiaolin Lin, Sunnyvale, CA (US); Minwoo Park, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 314 days.

(21) Appl. No.: 17/150,954

(22) Filed: Jan. 15, 2021

(65) Prior Publication Data

US 2021/0309248 A1 Oct. 7, 2021

Related U.S. Application Data

(60) Provisional application No. 63/003,879, filed on Apr. 1, 2020.

(51) Int. Cl.
*B60W 60/00* (2020.01)
*G06N 3/04* (2023.01)
(Continued)

(52) U.S. Cl.
CPC .......... *B60W 60/001* (2020.02); *B60W 50/06* (2013.01); *G06N 3/04* (2013.01);
(Continued)

(58) Field of Classification Search
CPC ............... B60W 60/001; B60W 50/06; B60W 2420/42; B60W 2050/065;
(Continued)

(56) References Cited

U.S. PATENT DOCUMENTS 10,430,673 B2 * 10/2019 Ryan ................... G08G 1/09626
10,885,698 B2 1/2021 Muthler et al.
(Continued)

OTHER PUBLICATIONS

"Taxonomy and Definitions for Terms Related to Driving Automation Systems for On-Road Motor Vehicles", National Highway Traffic Safety Administration (NHTSA), a Division of the US Department of Transportation, and the Society of Automotive Engineers (SAE), Standard No. J3016-201609, pp. 1-30 (Sep. 30, 2016).

(Continued)

*Primary Examiner* — Russell Frejd
*Assistant Examiner* — Brandon Z Willis
(74) *Attorney, Agent, or Firm* — Taylor English Duma L.L.P.

(57) ABSTRACT

In various examples, systems and methods are disclosed that preserve rich, detail-centric information from a real-world image by augmenting the real-world image with simulated objects to train a machine learning model to detect objects in an input image. The machine learning model may be trained, in deployment, to detect objects and determine bounding shapes to encapsulate detected objects. The machine learning model may further be trained to determine the type of road object encountered, calculate hazard ratings, and calculate confidence percentages. In deployment, detection of a road object, determination of a corresponding bounding shape, identification of road object type, and/or calculation of a hazard rating by the machine learning model may be used as an aid for determining next steps regarding the surrounding environment—e.g., navigating around the road debris, driving over the road debris, or coming to a complete stop—in a variety of autonomous machine applications.

21 Claims, 15 Drawing Sheets

(51) Int. Cl.
*G06N 3/08* (2023.01)
*B60W 50/06* (2006.01)

(52) U.S. Cl.
CPC ........... *G06N 3/08* (2013.01); *B60W 2420/42* (2013.01); *B60W 2554/4029* (2020.02); *B60W 2554/80* (2020.02)

(58) Field of Classification Search
CPC ....... B60W 2554/80; B60W 2554/801; B60W 2554/802; B60W 2554/4029; B60W 2554/40; B60W 2554/20; G06N 3/08; G06N 3/02; G06N 3/04; G06N 3/045; G06N 20/00; G06T 2207/20081; G06T 2207/20084; G06V 10/82
See application file for complete search history.

(56) References Cited

U.S. PATENT DOCUMENTS

| | | | | |
|---|---|---|---|---|
| 11,256,958 | B1* | 2/2022 | Subbiah | G06F 18/2155 |
| 11,334,762 | B1* | 5/2022 | Wrenninge | G06F 18/214 |
| 2018/0077376 | A1* | 3/2018 | Armeni | G06T 19/20 |
| 2019/0179979 | A1* | 6/2019 | Melick | G01P 21/02 |
| 2019/0253747 | A1* | 8/2019 | Ramaswamy | H04N 21/431 |
| 2020/0033880 | A1* | 1/2020 | Kehl | G06V 20/188 |
| 2020/0192389 | A1* | 6/2020 | ReMine | G06V 20/58 |
| 2021/0133976 | A1* | 5/2021 | Carmi | G16H 30/20 |
| 2022/0269279 | A1* | 8/2022 | Redford | B60W 50/0098 |
| 2022/0415030 | A1* | 12/2022 | Hou | G06T 11/00 |

OTHER PUBLICATIONS

"Taxonomy and Definitions for Terms Related to Driving Automation Systems for On-Road Motor Vehicles", National Highway Traffic Safety Administration (NHTSA), a Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

* cited by examiner

USING IMAGE AUGMENTATION WITH SIMULATED OBJECTS FOR TRAINING MACHINE LEARNING MODELS IN AUTONOMOUS DRIVING APPLICATIONS

CROSS-REFERENCE TO RELATED APPLICATIONS

This application claims the benefit of U.S. Provisional Application No. 63/003,879, filed on Apr. 1, 2020, which is hereby incorporated by reference in its entirety.

BACKGROUND

Autonomous vehicles and semi-autonomous vehicles leverage machine learning—e.g., deep neural networks (DNNs)—to analyze the road surface as a vehicle is driving in order to guide the vehicle's position with respect to road boundaries, lanes, road debris, road barriers, road signs, and the like. For example, DNNs may be used to detect road debris (e.g., animals, cones, construction material) in the oncoming portion of a road as an autonomous vehicle is driving, which may lead to an adjustment in the autonomous vehicle's position (e.g., maneuvering to avoid driving over a traffic cone in the middle of the road). However, training DNNs to accurately detect objects on the road requires a massive amount of training data, computational power, and human time and effort. Moreover, capturing real-world image data of roads with objects—such as debris—is a challenging task, as debris is generally avoided by drivers and/or quickly removed from the roadway. However, in order to sufficiently train a DNN, thousands of training data instances are required. As such, there can be a large discrepancy between the amount of useful training data including debris that can be collected and the amount of training data to accurately train a DNN to detect road debris.

For example, conventional systems often rely on real-world data captured by physical vehicles driving around in a variety of environments to generate training data for DNNs. However, this methodology is problematic for a number of reasons. For instance, physical vehicles have limited opportunities to encounter roadways with road objects that must be navigated around or driven over because communities prioritize clearing objects, which pose a dangerous risk to drivers, from the road. However, purposely setting up roadways, especially highways, with foreign objects in the path of vehicles is both difficult and dangerous. Likewise, testing DNNs for accuracy in detecting objects in order to decide whether to drive over or navigate around an object in such real-world environments is time-consuming and burdensome. Yet, automobile manufacturers are unlikely to release fully autonomous vehicles operating solely using DNNs until a high level of safety and accuracy are achieved. As a result, competing interests of safety and accuracy make generating a practical, sound, and reliable autonomous driving system increasingly onerous.

SUMMARY

Embodiments of the present disclosure relate to training machine learning models to detect objects using real-world images augmented with simulated objects. Systems and methods are disclosed that preserve rich, detail-heavy information in real-world images when training machine learning models by inserting simulated instances of road debris, which are difficult to capture organically or purposely set up in a real-world scenario, into the real-world images. As such, embodiments of the present disclosure relate to detecting objects—including, but not limited to, road debris (e.g., cardboard boxes, rocks, wheels, wooden pallets, deceased animals, logs, traffic cones, mattresses, etc.) and/or signage (e.g., street signs, poles, etc.)—for autonomous machines.

In contrast to conventional systems, such as those described above, the system of the present disclosure may train a machine learning model to detect objects on a road—whether a deceased animal or a mattress—and determine a bounding shape for each object in an input image by using real-world images that are augmented with simulated objects. As a result, even though it is cumbersome and dangerous to obtain real-world images of road debris on a driving surface, the machine learning model may be trained on a large data set of real-world images, augmented with a variety of simulated road objects, which maintain as much detail from the real-world images as possible. As such, by using real-world images with simulated objects to train the machine learning model, the model is able to be trained using a high volume of images that are closer to real-world scenarios, leading to higher accuracy in detection of objects on a driving surface, reduced time to train a machine learning model to achieve a high level of accuracy, and improved outcomes in decision-making when a road object is encountered.

In addition to the detection of a road object, a bounding shape around the road object and a hazard rating of the road object may be computed by machine learning model(s) to aid the system in understanding the hazardous risk of the road object and the action (e.g., maneuver around, drive over, come to a full stop, etc.) to perform in response—thereby increasing the accuracy of responses to road objects encountered by the system. To further decrease run-time for real-time operation of the system, the machine learning model(s) may be trained to detect whether there is an object on the road (regardless of whether the type of object is correctly identified) using zero-shot learning, thereby removing the constraint of conventional systems that require an accurate identification of a road object before determining next steps in response to a detected road object.

BRIEF DESCRIPTION OF THE DRAWINGS

The present systems and methods for training machine learning models to detect objects using real-world images augmented with simulated objects are described in detail below with reference to the attached drawing figures, wherein.

DETAILED DESCRIPTION

Figure 1:
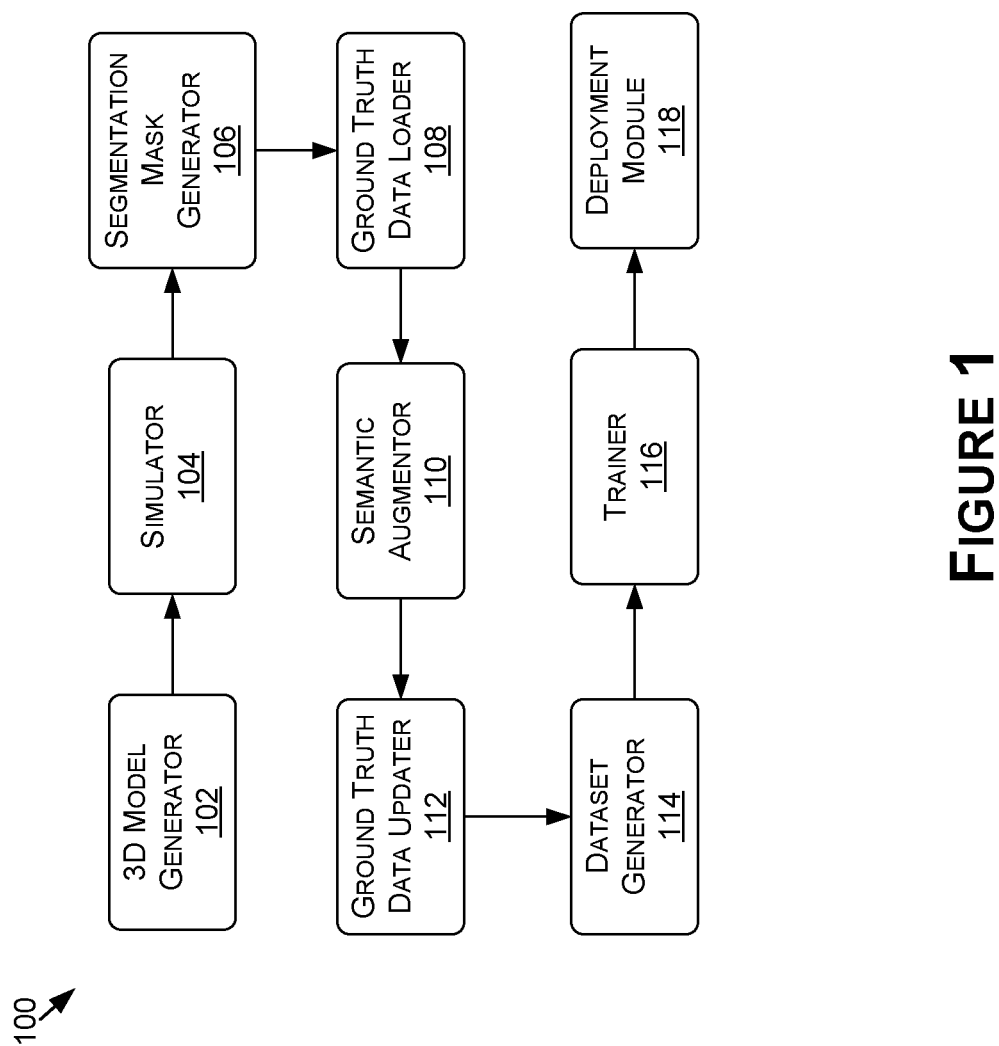
FIG. 1 is a data flow diagram illustrating an example process for training machine learning models using real-world images augmented with simulated objects and ground truth data, in accordance with some embodiments of the present disclosure.

Systems and methods are disclosed related to training machine learning models to detect objects using real-world images augmented with simulated objects. Although the present disclosure may be described with respect to an example autonomous vehicle 1000 (alternatively referred to herein as "vehicle 1000" or "ego-vehicle 1000," an example of which is described herein with respect to FIGS. 10A-10D), this is not intended to be limiting. For example, the systems and methods described herein may be used by non-autonomous vehicles, semi-autonomous vehicles (e.g., in adaptive driver assistance systems (ADAS)), robots, warehouse vehicles, off-road vehicles, flying vessels, boats, a passenger vehicle, a car, a truck, a bus, a first responder vehicle, a shuttle, an electric or motorized bicycle, a motorcycle, a fire truck, a police vehicle, an ambulance, a construction vehicle, an underwater craft, a drone, and/or another type of vehicle (e.g., that is unmanned and/or that accommodates one or more passengers). In addition, although the present disclosure may be described with respect to autonomous driving, this is not intended to be limiting. For example, the systems and methods described herein may be used in robotics, aerial systems, boating systems, and/or other technology areas, such as for perception, world model management, path planning, obstacle avoidance, and/or other processes.

The system of the present disclosure generates training data that includes both real-world and simulated data to train a machine learning model (e.g., a deep neural network (DNN), such as a convolutional neural network (CNN)) and to test the machine learning model by using the training data as ground truth data (e.g., annotated labels corresponding to lane lines, road boundaries, text, and/or other features) while maintaining as much of the rich, real-world data as possible. As a result, the accuracy of detecting objects, such as road debris and/or road signs, in the real-world environment is increased while providing a high volume of data to train and test the machine learning model. For example, the image data to train and test the machine learning model may be a real-world image of a road that includes a synthetic, or simulated, image of an object on the road. Many instances of a simulated object may be generated to correspond to a number of different characteristics (e.g., location, orientation, appearance attributes, lighting, occlusion, and/or environmental conditions) such that a diversity of object instances may be used to generate a more robust training set. By randomly sampling these object instances (or the conditions that are used to modify the instances), various instances of the simulated object may be inserted into the previously captured real-world image data, thereby generating a large amount of image data and ground truth data that corresponds to simulated road objects (e.g., road debris) in real-world image data. Some non-limiting benefits of the system and methods of the present disclosure are increased object detection accuracy, increased recognition of road debris that does not easily fit into a particular class of objects, and the ability to classify the objects that are detected—thereby reducing the computational burden for in-vehicle inferencing.

In embodiments of the present disclosure, and to ultimately help determine a path for autonomous vehicles, a DNN may be used to generate bounding shapes (e.g., square, rectangle, triangle, polygon) that correspond to objects or debris on a road (e.g., cardboard boxes, rocks, wheels, wooden pallets, deceased animals, logs, traffic cones, mattresses, road signs, etc.). Simulated objects on a road may be generated using simulators (e.g., NVIDIA DriveSim). The simulated objects may be generated from the perspective of a virtual sensor on a car in a virtual environment generated by a simulator. In some examples, multiple instances of each object are generated by simulating the same object under different conditions. For example, a simulated mattress may be modified as though it were subjected to different times of day, different positions relative to the sun, different orientations or poses, and/or different distances from the virtual sensor in the virtual environment to create instances of the simulated mattress that reflect different environmental and position conditions. A segmentation mask corresponding to each instance of an object may also be generated and used to determine a bounding shape that encompasses each instance. For instance, a bounding shape may be generated by forming a polygon that tightly encompasses all of the pixels in a segmentation mask for an instance of an object.

In some embodiments, a real-world image (and its corresponding ground truth data) may be augmented with the instances of the simulated objects to generate image data to train the machine learning model as well as to generate ground truth data to test the machine learning model. For example, a real-world image of a road may have corresponding ground truth data that denotes objects (e.g., cars on the road) in the scene with a bounding shape surrounding each object (e.g., each car on the road has a bounding box around it). In some examples, the real-world image is captured using a sensor attached to a physical car. To generate a training image, the real-world image may be augmented by inserting an instance of a simulated object, such as a cardboard box, into the image. In some examples, the instance to insert into the real-world image is selected by determining a random sampling of criteria and selecting one or more instances that meet (or most closely match) the sampled criteria. For example, only instances of the simulated object that meet position and orientation criteria may be selected to be included in the real-world image. Likewise, the criteria that an instance must meet may also be determined by the conditions present in the real-world image. For example, the sun position and time of day in a real-world image may be identified and used to select an instance of an object that was simulated under similar conditions. In other examples, the conditions may be randomly selected such that the simulated instance of the object may not match conditions of the real-world environment at the time of image capture. By doing so, in embodiments, the machine learning model may learn to detect previously unknown objects due to the variety of different training data samples processed.

Once an instance of a simulated object has been inserted into a real-world image, one or more conditions may be evaluated to determine whether the augmented real-world image is the final training image. For instance, the distance from the instance of the simulated object to a driving surface may be evaluated to determine whether the distance exceeds a threshold. For example, if the instance of the simulated object, such a cardboard box that adheres to specified criteria, is five feet above the driving surface and exceeds a threshold of three feet, then the instance may not be selected for inclusion in the real-world image. Likewise, overlap conditions regarding placement of the instance of the simulated object with respect to objects present in the real-world image may be considered. For example, a bounding shape of the instance of the simulated object may be compared to bounding shapes of the objects in the real-world image (as determined by the real-world image's corresponding ground truth data) to determine whether the bounding shapes overlap. If the bounding shapes overlap, the instance of the simulated object may be rejected and not inserted into the real-world image. In some examples, the manner in which the bounding shapes overlap (e.g., whether one object is in front of another) may be considered. If all (or enough) conditions are met, the instance of the simulated object may be inserted into the real-world image and used to train the machine learning model.

The bounding shape of the simulated instance of the object and the bounding shapes of the objects in the real-world image—as denoted in the corresponding ground truth data—may then be used as ground truth data to test whether the machine learning model is correctly identifying objects or debris. In some examples, the ground truth data may also be used to determine whether the machine learning model is correctly classifying objects, such as animals versus cardboard boxes, in the real-world image. The machine learning model may also be tested through the use of zero-shot learning techniques to determine whether the model is able to identify previously-unseen objects on the road as potential hazards, even if the model does not classify previously-unseen objects accurately. For example, a real-world image augmented with a towel (which had not been included in images used to train the model) may be used to test the model and determine whether the model correctly drew a bounding shape around the towel, regardless of whether the model identified the object itself as a towel. As a result, and due to the vast amount of potential road debris types, the machine learning model may still be used to accurately detect unfamiliar road debris, which may allow the autonomous vehicle to navigate around the debris while preserving the safety of the occupants.

With reference to FIG. 1, FIG. 1 is a data flow diagram illustrating an example process 100 for generating real-world images augmented with virtual objects to train a machine learning model to detect road debris, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, components, features, and/or functionality described with respect to the process 100 of FIG. 1 may be similar to those of the vehicle 1000, example computing device 1100 of FIG. 11, and/or example data center 1200 of FIG. 12.

At a high level, the process 100 may include a 3D model generator 102 generating multiple representations (e.g., virtual instances) of an object (e.g., road debris) adhering to a variety of criteria in a virtual, simulated environment generated by simulator 104. The simulator 104 may include a virtual vehicle with a virtual sensor that records and captures simulation data from the perspective of the virtual sensor as the virtual vehicle drives on a driving surface. In some embodiments, the representations (e.g., virtual instances), as generated by the 3D model generator 102, may then be inserted into a virtual environment of simulator 104 and recorded in images from the perspective of the virtual sensor. As the simulation data is being recorded, a segmentation mask of the representations of the object may also be generated by the segmentation mask generator 106. Ground truth data, which includes a real-world image and annotations for objects on a driving surface of the real-world image, may be loaded by the ground truth loader 108. The semantic augmentor 110 may augment the images with (e.g., by inserting) one or more generated graphical representations of the object into the loaded ground truth data. In some embodiments, the representations may be selected based on a random sampling of criteria and/or criteria matching conditions in the real-world image of the ground truth data. In some embodiments, only those representations that satisfy constraints regarding distance thresholds from the driving surface and the amount of overlap with other objects in the real-world image are used to augment (e.g., inserted into) the real-world image to create a training image. The semantic augmentor 110 may also draw a bounding shape around the inserted representation based on the corresponding segmentation mask to determine whether the inserted representation meets the constraints. Once the representation that satisfies the constraints is inserted into the real-world image, the ground truth data may be updated by the ground truth data updater 112 to include the augmented real-world image and the corresponding bounding shape around the virtual object. The augmented real-world image may be finalized by dataset generator 114 and used by trainer 116 to train a machine learning model. Once trained, the machine learning model may be deployed via deployment module 118 to be used by the vehicle 1100 to detect debris or objects on the driving surface using images and to determine next steps in response to a detected road object. The next steps or operations may include world model management, path planning, control decisions, obstacle avoidance, and/or other operations of an autonomous or semi-autonomous driving software stack.

The 3D model generator 102 may be a game-based engine that generates virtual instances of a virtual object. The virtual objects span a variety of potential road debris or object types including, but not limited to, cardboard boxes, rocks, wheels (and wheel parts), wooden pallets, deceased animals, ladders, logs, traffic cones, mattresses, road signs, and other objects. The 3D model generator 102 may generate numerous instances of a given virtual object and subject each virtual instance to a different set of conditions such as location, lighting, orientation, pose, occlusion, environmental conditions, and/or appearance attributes. For example, the 3D model generator 102 may generate twenty instances of a simulated construction cone, where each representation of the construction cone uses a different material or color tone, providing a large data set of construction cones with which to train machine learning model(s).

In some embodiments, environmental conditions imposed on virtual instances of a virtual object may include varying times of day, positions relative to the sun, weather conditions (e.g., rain, fog, cloudy), visibility distances, and/or different distances from the virtual sensor in the virtual environment for domain randomization. In some embodiments, appearance attributes of the virtual instances may include varying color tones, materials, and textures. For instance, the 3D model generator 102 may generate a set of 3D virtual instances of a mattress, where each instance of the mattress is in a different position and subjected to a different orientation and sun position. Likewise, each 3D virtual instance of the mattress may be subjected to varying weather conditions such as a rainy day versus a cloudy day, or varying lighting conditions such as day, night, dawn, dusk, etc. In some embodiments, the 3D model generator 102 may generate virtual instances of an object at set intervals or increments of various conditions to provide a high volume of virtual instances or other representations that can be used to train machine learning model(s). For instance, the 3D model generator 102 may generate a virtual instance at set distance intervals away from a virtual sensor on a virtual vehicle in order to ensure there is a high number of virtual instances to select from. For example, the 3D model generator may generate a virtual instance every two feet away from the virtual sensor. Similarly, the 3D model generator 102 may generate multiple virtual instances that have an identical set of some conditions (e.g., position, location, orientation), but that differ with respect to one condition (e.g., weather condition) for each instance to ensure that any possible set of selected criteria is likely to closely match a generated virtual instance.

In some embodiments, the 3D model generator 102 may operate with simulator 104 to determine the application of various conditions onto virtual instances of objects. For instance, the simulator 104 may provide information regarding conditions of a simulated environment that may be used by the 3D model generator 102 to generate virtual instances accordingly. For example, information regarding an angle of a virtual sensor on a virtual car in the simulated environment may be used by the 3D model generator 102 to create virtual instances that have a corresponding orientation or pose with respect to the angle of the virtual sensor mounted on the virtual car in the simulated environment. In any example, a sensor model corresponding to a real-world sensor of the vehicle 1100 may be used in a virtual sensor in the simulated environment.

Figures 2A, 2B:
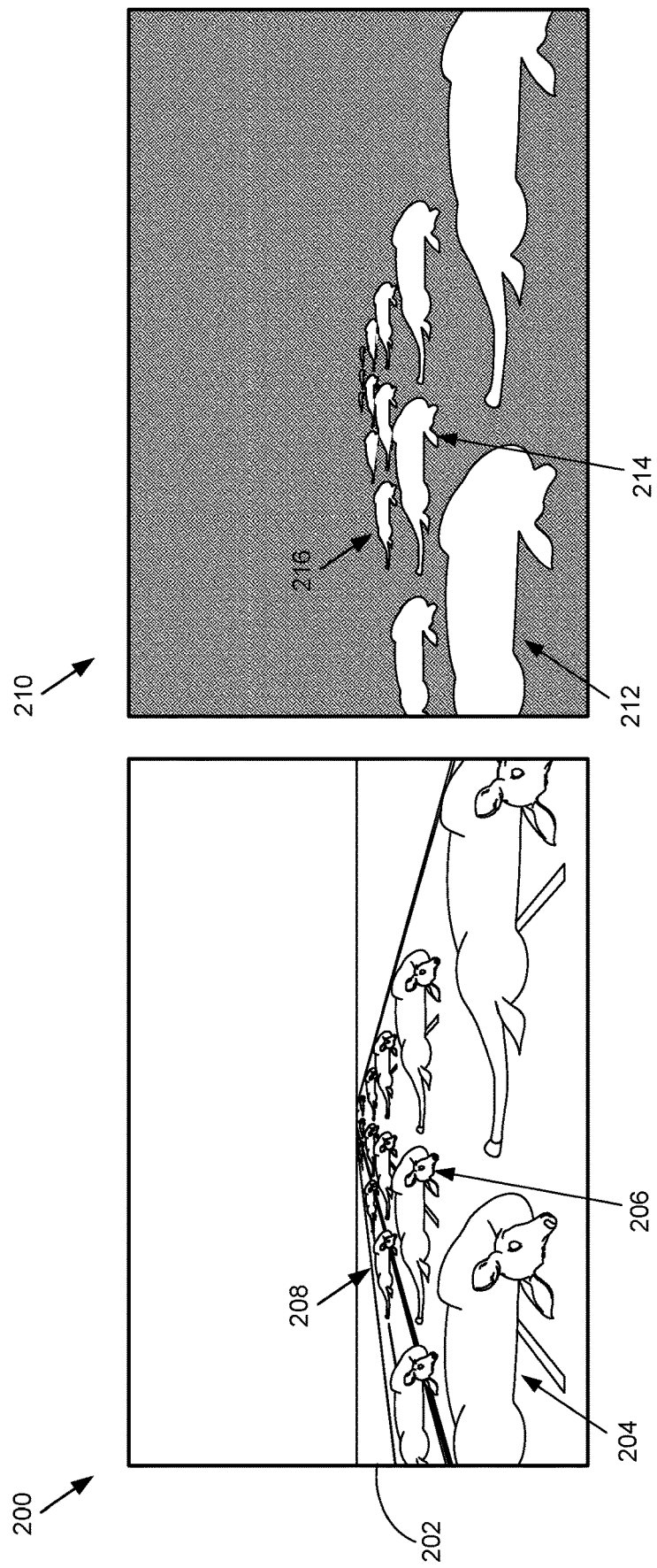
FIG. 2A is an example of a simulated image with virtual instances of a deceased animal, with each instance having varying values of criteria, in accordance with some embodiments of the present disclosure.
FIG. 2B is an example of a segmentation mask corresponding to the virtual instances of the deceased animal in FIG. 2A, in accordance with some embodiments of the present disclosure.

Now referring to FIG. 2A, FIG. 2A is an example of a simulated image that includes multiple representations (e.g., virtual instances) of a deceased deer as a road obstacle, in accordance with some embodiments of the present disclosure. In this example, the simulated image 200 includes a virtual environment 202 and representations (e.g., virtual instances) 204, 206, and 208, of a deceased deer. Each virtual instance 204, 206, and 208, of the deceased deer has a different position and location and, for the purposes of this example, may also have other varying characteristics such as color tone. The high number of virtual instances, each with a different set of conditions, provides a high likelihood that at least one of the generated virtual instances will meet (or closely meet) selected criteria.

Turning back to FIG. 1, simulator 104 may provide a virtual environment to capture data of a virtual vehicle driving in a virtual environment from the perspective of a virtual sensor mounted to the virtual vehicle. In some embodiments, the virtual environment and the virtual sensor on the virtual vehicle may be adjusted to align with conditions (e.g., sensor angle and height from the ground) in a real-world image used as a part of ground truth data. The virtual instances of objects generated by the 3D model generator 102 may be inserted into the virtual environment of the simulator 104. Once inserted into the virtual environment, the simulator 104 may adjust some properties of the virtual instances. For instance, those virtual instances that are not located on a driving surface may be discarded. Similarly, the virtual instances may be scaled smaller or larger based on distance from the virtual sensor on the virtual vehicle, such that virtual instances that are farther from the virtual sensor may be scaled as smaller than those that are closer to the sensor. The simulator 104 may also rearrange the virtual instances based on other conditions, such as placing those virtual instances that were generated under shade conditions in the portion of the virtual environment where clouds are obstructing the sun.

Once virtual instances have been inserted into the virtual environment, simulator 104 may record the vehicle driving on a driving surface and encountering one or more virtual instances of road debris. As described herein, the data recorded by the simulator 104 may also be used by segmentation mask generator 106 to generate segmentation masks of the virtual instances.

Now referring to FIG. 2A, simulated image 200 includes a virtual environment 202, as generated by the simulator 104, and multiple representations (e.g., virtual instances) 204, 206, and 208 of a deceased deer. As illustrated in FIG. 2A, the multiple virtual instances 204, 206, and 208 are integrated into the virtual environment 202 as road debris on a driving surface. The virtual instances 204, 206, and 208 may be further modified or enhanced to meet the conditions of the virtual environment 202. For instance, any virtual instances that are outside of the driving surface in the virtual environment 202 are not included. Likewise, the virtual instances 204, 206, and 208 may be scaled in proportion to the distance from a virtual sensor on a virtual vehicle in the virtual environment 202. For instance, the virtual instance 206 of the deceased deer is scaled to be smaller than the virtual instance 204 because the virtual instance 206 is farther from the virtual sensor compared to the virtual instance 204. Similarly, as depicted in FIG. 2A, the virtual instance 208 is scaled to be much smaller than the virtual instance 204 and slightly smaller than the virtual instance 206 based on the distance from the virtual sensor. Additionally, the virtual instances are oriented such that each virtual instance lays flat on the driving surface, which has a slight upward tilt in the virtual environment 202.

Turning back to FIG. 1, segmentation mask generator 106 generates segmentation mask(s) corresponding to the virtual instances of the virtual object. A segmentation mask may represent a smaller portion of an image and denote the pixels that relate to that smaller portion of the image. For instance, the segmentation mask generator 106 may generate a separate segmentation mask that represents the pixels corresponding to each virtual instance of the object. For example, a segmentation mask for a particular virtual instance may denote the pixels in an image that represent the virtual instance, but provide no data regarding the virtual instance itself (e.g., color, appearance etc.). In some embodiments, a segmentation mask may include the pixels encompassed by all of the virtual instances. In some embodiments, the segmentation mask may be stored as a single file or as a series of files with each file corresponding to a particular virtual instance. Likewise, the segmentation mask may also be stored as a transparent image file (e.g., PNG file type).

Now referring to FIG. 2B, FIG. 2B is an example segmentation mask corresponding to virtual instances 204, 206, and 208 of a deceased deer in FIG. 2A. The segmentation mask may be represented as a mask representing all of the virtual instances 204, 206, and 208, as shown by segmentation mask 210. Likewise, the segmentation mask may be represented by a series of segmentations masks, where each mask corresponds to a single virtual instance, as shown by segmentation masks 212, 214, and 216. The segmentation masks 212, 214, and 216 each outline and denote the pixels present in each virtual instance 204, 206, and 208, respectively, and show the position of each virtual instance 204, 206, and 208 within virtual environment 202. The segmentation masks 212, 214, and 216, however, may not include information (e.g., pixel color) regarding the corresponding the virtual instances 204, 206, and 208, respectively.

With the pixels of each virtual instance denoted by segmentation mask(s), segmentation mask generator 106 may also generate bounding shapes (e.g., square, rectangle, ellipse, triangle, polygon, etc.) that encompass each virtual instance to determine whether a virtual instance satisfies constraints within a real-world image. For instance, for a given virtual instance of an object, the segmentation mask generator 106 may determine pixels corresponding to the virtual instance, using the segmentation mask for that virtual instance, and draw a bounding polygon (or other shape) around the segmentation mask that encompasses all of the pixels. In some embodiments, the bounding shape may be tightly formed around the pixels.

Figure 3:
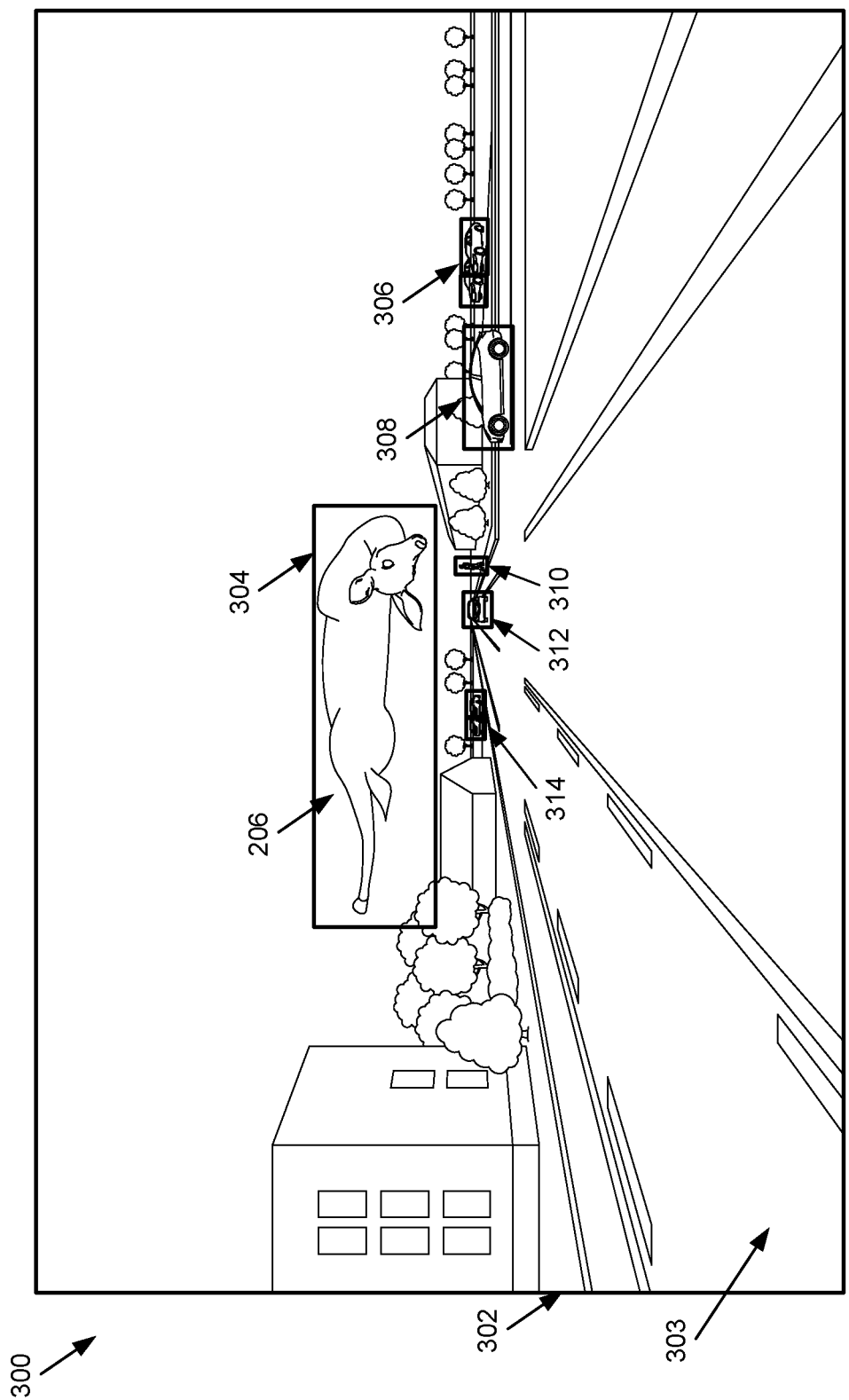
FIG. 3 is an example of a visualization of a real-world image with an augmented simulated object that fails to satisfy threshold distance constraints, in accordance with some embodiments of the present disclosure.
Figure 4:
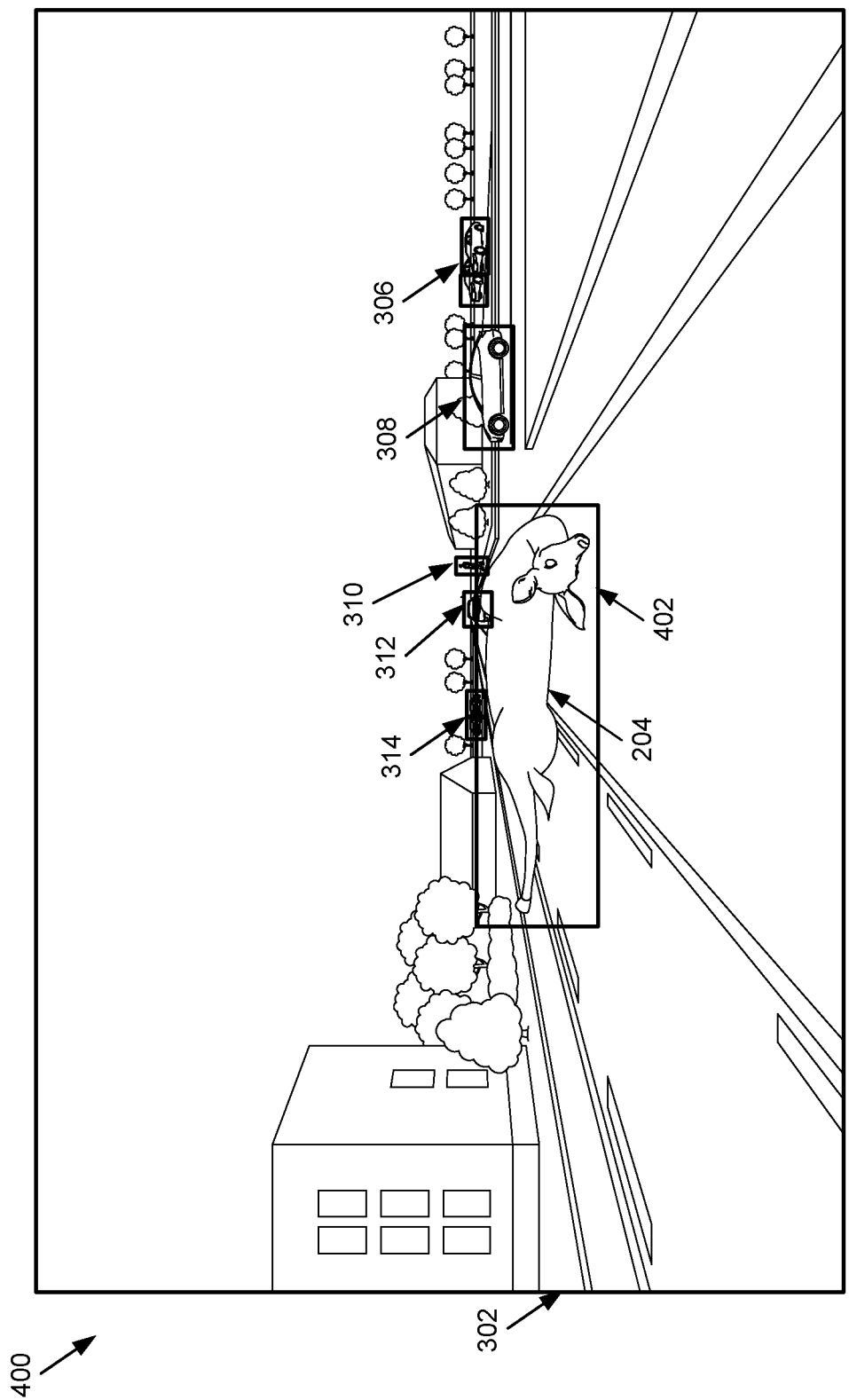
FIG. 4 is an example of a visualization of a real-world image with an augmented simulated object that satisfies an overlap constraint, in accordance with some embodiments of the present disclosure.
Figure 5:
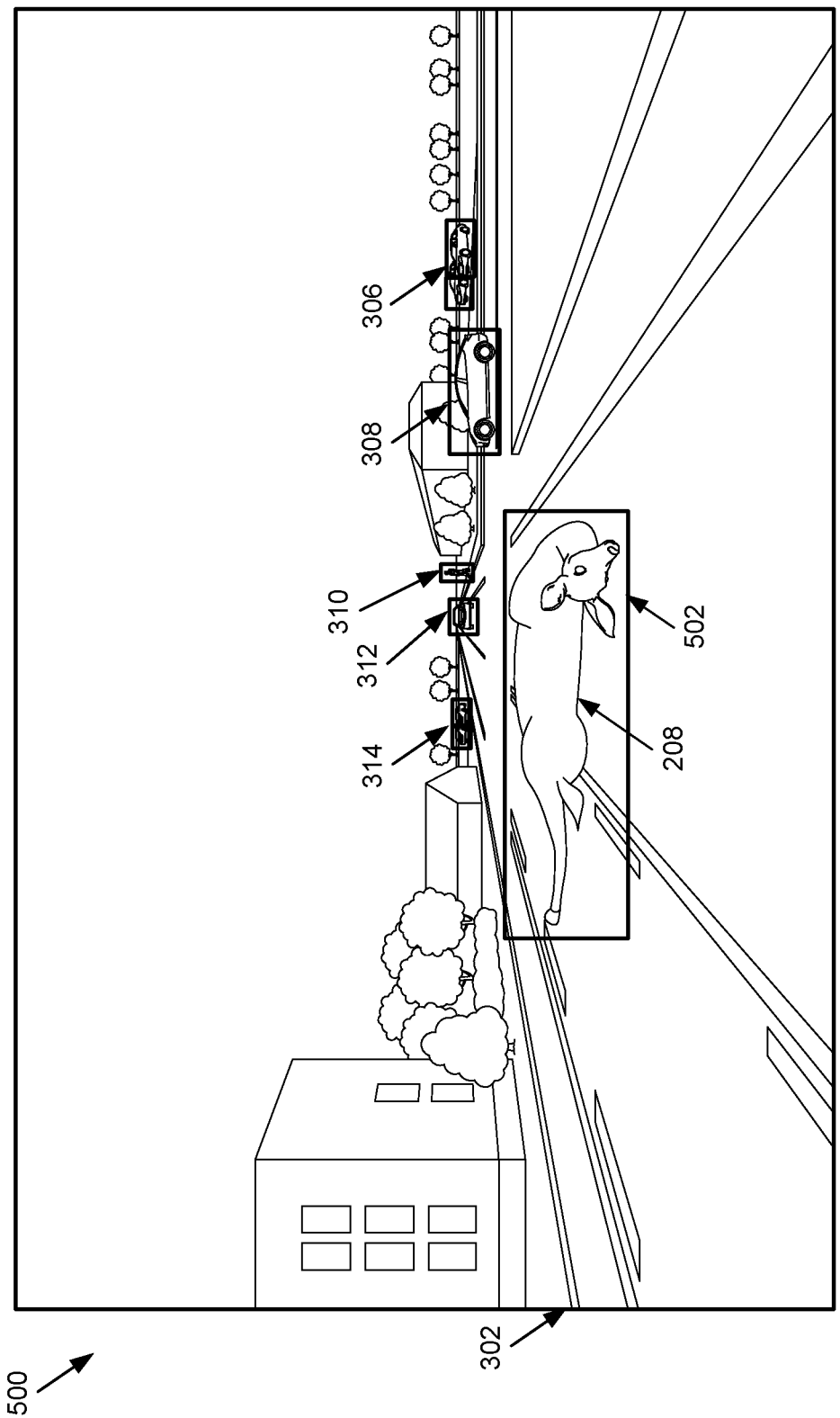
FIG. 5 is an example of a visualization of a real-world image with an augmented simulated object that satisfies threshold distance constraints and an overlap constraint, in accordance with some embodiments of the present disclosure.

Now referring to FIG. 3, FIG. 3 is an example visualization 300 of a real-world image with an augmented simulated object that fails to satisfy threshold distance constraints, in accordance with some embodiments of the present disclosure. Visualization 300 also includes ground truth annotations such as bounding shapes around objects in the real-world image. As shown in FIG. 3, virtual instance 206 of FIG. 2A has been inserted into the visualization 300. The virtual instance 206 includes a bounding shape 304, which was formulated based on segmentation mask 214 of FIG. 2B. The bounding shape 304 encapsulates all of the pixels that represent the virtual instance 206. FIGS. 4 and 5 similarly show bounding shapes 402 and 502 around virtual instances 204 and 208, respectively, drawn by the segmentation mask generator 106 based on their respective segmentation masks 212 and 216.

Turning back to FIG. 1, ground truth loader 108 receives and loads ground truth data. The ground truth data may be a real-world image with annotation data, such as bounding shapes and labels (e.g., types of objects in the road, hazard rating). The ground truth data may be generated by manually and/or automatically generating shapes around objects. For example, the bounding shapes or other annotation data used for the ground truth data may be synthetically produced (e.g., generated from computer models or renderings), real produced (e.g., designed and produced from real-world data), machine-automated (e.g., using feature analysis and learning to extract features from data and then generate bounding shapes), human annotated (e.g., annotation expert, defines the bounding shape of objects), and/or a combination thereof (e.g., polyline points annotated by human, and rasterizer generates full polygons from the polyline points). For example, the ground truth data may be a real-world image of a road with other cars in road lanes with annotations such as bounding shapes around each car on the road. The ground truth data may also include annotations such as bounding shapes around other objects in view, such as road signs or people crossing the road. Similarly, the ground truth data may include a label to denote an object is a towel and label the detected object as non-hazardous.

Now referring to FIG. 3, visualization 300 includes ground truth annotations of a real-world image include bounding shapes around objects in view. For instance, visualization 300 includes real-world image 302 that includes a rich, accurate level of detail only possible through image data of the real world. Visualization 300 also includes, prior to insertion of a virtual instance 204, bounding shapes 306, 308, 310, 312, and 314 around various objects on the driving surface. For example, the bounding shapes 306, 308, 312, and 314 each encompass pixels representing a particular vehicle. Likewise, the bounding shape 310 encapsulates the pixels representing a person crossing the roadway. In this example, the bounding shapes 306, 308, 310, 312, and 314 may have been drawn by a human prior to loading by the ground truth loader 108 of FIG. 1. For the purposes of this example, the objects in real-world image 302 (e.g., person crossing the street) may be labeled as hazardous to indicate the object should be avoided. Visualizations 400 and 500 in FIGS. 4 and 5, respectively, similarly show real-world image 302 with ground truth annotations such as the bounding shapes 306, 308, 310, 312, and 314.

Turning back to FIG. 1, semantic augmentor 110 may determine which representations of an object to use to augment a real-world image. In some embodiments, the semantic augmentor 110 may sample (randomly, according to one or more embodiments) criteria or conditions (e.g., location, lighting, orientation, pose, environmental conditions, and/or appearance attributes) and select one or more representations that match, or closely match, the sampled criteria. For instance, the semantic augmentor 110 may randomly select an orientation and a position of a mattress and search for a representation of a mattress that meets the randomly sampled criteria. In some embodiments, the semantic augmentor 110 may select representations that satisfy the conditions present in a real-world image present in ground truth data. For example, the semantic augmentor 110 may search for representations that exhibit similar conditions present in the real-world image, such as sun position, time of day, pose, orientation, lighting, occlusion, shade, and weather conditions. In some embodiments, the semantic augmentor 110 may select criteria using a hybrid approach with some criteria based on what is present in the real-world image and others selected based on random sampling. In some embodiments, the semantic augmentor 110 may also insert representations into the real-world image and also modify the representations to adhere to conditions in the real-world image. For instance, a representation that closely matches (but does not exactly match) the sampled criteria may be inserted into a real-world image and may be adjusted to meet the exact sampled criteria. For example, the representation with closely matching criteria may be adjusted such that its pose exactly aligns with the perspective of a sensor used to capture the real-world image.

The semantic augmentor 110 may also use representations meeting selected criteria to augment a real-world image and determine whether the representations satisfy constraints for placement within the real-world image. For instance, the representation may have been generated under conditions similar to that of the real-world image (e.g., weather conditions) and that of the randomly sampled criteria, but may not satisfy additional distance thresholds and overlap constraints when inserted into the real-world image. For instance, after using a representation to augment a real-world image, the representation may be so high off of the driving surface that the representation appears to be in the sky. Likewise, the inserted representation, when placed within the real-world image, may overlap or appear to be immediately on top of (or under) another object in the road. To minimize the occurrence of these issues, the semantic augmentor 110 may check a variety of constraints before using the augmented real-world image for training a machine learning model.

The semantic augmentor 110 may determine whether the representation used to augment a real-world image satisfies a distance threshold constraint. For instance, the semantic augmentor 110 may verify that the representation satisfies a vertical distance threshold constraint (e.g., distance vertical from a driving surface of the real-world image). For example, the semantic augmentor 110 may determine whether an inserted representation is more than one foot, two, three, five, etc. feet above the driving surface. Likewise, the distance threshold may be a horizontal distance threshold from boundaries of the driving surface to determine whether the virtual instance is outside of the horizontal bounds of the driving surface. For instance, the semantic augmentor 110 may check whether the inserted representation is within one foot, two feet, five feet, etc. outside of the boundaries of the driving surface. In some embodiments, distances may be measured within a three-dimensional coordinate system in the real-world image to determine whether the inserted representation satisfies the distance threshold constraint. In some embodiments, the semantic augmentor 110 determines whether a representation satisfies the distance thresholds using the corresponding bounding shape of the representation to measure the distance from the driving surface. In some embodiments, representations that fail to meet a distance threshold constraint are rejected and are not inserted into the real-world image.

Now referring to FIG. 3, FIG. 3 is an example of a real-world image (with ground truth annotations) augmented with a representation of a simulated object. Representation (e.g., virtual instance) 206 has been used to augment real-world image 302 and has a bounding shape 304 associated with it. In this example, the distance between the virtual instance 206 (or its bounding shape 304) and driving surface 303 may be determined within the three-dimensional coordinate system of the real-world image 302 to determine whether the virtual instance 206 (or its bounding shape 304) exceeds a vertical distance threshold of, for example, one foot above the driving surface 303. When calculated, the virtual instance 206 is actually three feet above the driving surface 303 and fails to meet the distance threshold. Likewise, the distance from the virtual instance 206 (or its bounding shape 304) to the horizontal boundaries of driving surface 303 may be checked to see whether the virtual instance 206 (or its bounding shape 304) falls within, for example, six inches of the outside of the boundaries of the driving surface 303 to meet a horizontal distance threshold. With the virtual instance 206 (and its bounding shape 304) placed well within the boundaries of driving surface 303, the virtual instance 206 (and its bounding shape 304) easily meets the horizontal distance threshold constraint, but fails to meet the vertical distance threshold constraint. Because visualization 300 does not meet both constraints, the visualization 300 may not be selected to train or test a machine learning model to detect road debris.

Now referring to FIG. 4, FIG. 4 is an example visualization 400 of a real-world image with an augmented simulated object that satisfies threshold distance constraints and an overlap constraint, in accordance with some embodiments of the present disclosure. Visualization 400 also includes ground truth annotations such as bounding shapes around representations of other objects in the real-world image. Virtual instance 204 of FIG. 2A and its associated bounding shape 402 are included in the visualization 400. The virtual instance 204 may be checked for the distance threshold constraints, as mentioned with respect to FIG. 3. In this example, the virtual instance 204 (and its bounding shape 402) is well within a vertical distance threshold of three feet above a driving surface and a horizontal distance threshold of six inches outside of the boundaries of the driving surface. Accordingly, the virtual instance 204 may be inserted into real-world image 302 to generate a training image.

Now referring to FIG. 5, FIG. 5 is an example visualization 500 of a real-world image with an augmented simulated object that satisfies threshold distance constraints and an overlap constraint, in accordance with some embodiments of the present disclosure. Visualization 500 includes virtual instance 208 of FIG. 2A placed in real-world image 302 as well as existing ground truth data such as bounding shapes around objects in the real-world image 302. Similar to FIG. 4, the virtual instance 208 and its bounding shape 502 are well within vertical and horizontal distance thresholds and may be inserted into the real-world image 302 to generate a training image to train machine learning model(s) to detect road debris.

The semantic augmentor 110 may also determine whether virtual instances inserted into a real-world image used for ground truth data satisfy overlap constraints with other objects in the real-world image. For instance, the real-world image used in the ground truth data may include objects, such as other cars and pedestrians, on a driving surface that should not overlap with an inserted virtual instance. The ground truth data may also include annotations such as bounding shapes for each of the objects in the real-world image. Using the ground truth annotations of objects in the real-world image, the semantic augmentor 110 may determine whether to use a virtual instance to augment the real-world image.

The semantic augmentor 110 may determine that an overlap constraint is satisfied if a bounding shape of a virtual instance does not intersect or overlap with bounding shapes of objects in a real-world image and existing ground truth data. Likewise, the semantic augmentor 110 may determine that the overlap constraint is met if pixels encompassed within the bounding shape of the virtual instance do not overlap with, or are not included in the same space as, pixels encompassed within the bounding shapes of the objects in the ground truth data. For example, if a pedestrian is on a crosswalk, a virtual instance of a mattress may be checked to verify whether a bounding shape corresponding to the pedestrian intersects with a bounding shape of the virtual instance in order to ensure that the virtual instance is not on top of, or overlapping with, the pedestrian. Likewise, the pixels within each bounding shape may be checked against each other to determine overlap. In some embodiments, the semantic augmentor 110 may determine whether a virtual instance satisfies an overlap constraint based on whether the virtual instance has been inserted in front of or behind other objects in the real-world image. In some embodiments, virtual instances that do not satisfy an overlap constraint are rejected and not inserted into the real-world image.

Now referring to FIG. 4, virtual instance 204 of FIG. 2A has been inserted into the visualization 400. The existing ground truth data includes bounding shapes 306, 308, 310, 312, and 314 around objects that exist in the real-world image. For example, the bounding shapes 306, 308, 310, 312, and 314 enclose the pixels for cars and pedestrians. A bounding shape 402 that encapsulates all of the pixels represented by virtual instance 204 is also illustrated. To determine whether an overlap constraint has been met for virtual instance 204, the pixels within the boundaries of the bounding shape 402 are checked against the pixels within the boundaries of the bounding shapes 306, 308, 310, 312, and 314. In this example, the pixels enclosed by the bounding shape 402 overlap, or are in the same location as, pixels enclosed by the bounding shapes 310, 312, and 314. However, because the virtual instance 204 and its corresponding bounding shape 402 are in front of the bounding boxes 310, 312, and 314 (and the objects they enclose), the virtual instance 204 satisfies the overlap constraint. Because the virtual instance 204 met the distance threshold constraints (as described herein) and the overlap constraint, the virtual instance 204 is selected to be inserted into real-world image 302 to train machine learning model(s).

Now referring to FIG. 5, visualization 500 includes virtual instance 208 of FIG. 2A inserted into real-world image 302. As with FIGS. 3 and 4, FIG. 5 includes ground truth annotations, such as bounding shapes 306, 308, 310, 312, and 314 around objects that exist in the real-world image, in existing ground truth. Virtual instance 208 and its corresponding bounding shape 502 may be checked to determine whether the virtual instance 208 meets an overlap constraint. The bounding shape 502 and the virtual instance 208 are checked for compliance with an overlap constraint that requires no overlap with other bounding shapes in the visualization 500. In this example, the pixels encompassed within the bounding shape 502 do not intersect or overlap with any of the pixels encompassed in the other bounding shapes 306, 308, 310, 312, and 314. As described herein, the virtual instance 208 meets distance threshold constraints and the overlap constraint. Accordingly, visualization 500 and real-world image 302 augmented with virtual instance 208 may be used as a training image to train machine learning model(s) to detect road debris.

Turning back to FIG. 1, ground truth data updater 112 may update ground truth data to reflect that existing ground truth data has been augmented with virtual instances of an object. For instance, once a virtual instance inserted into a real-world image satisfies necessary constraints (e.g., distance thresholds and overlap constraints), the ground truth data updater 112 may update the existing ground truth data, as stored for evaluating a machine learning models' effectiveness, to include the inserted virtual instance and the associated bounding shape around the virtual instance. The ground truth data updater 112 may also add in labels regarding hazard ratings and/or object type labels for the inserted virtual instance.

Referring to FIG. 5, visualization 500, which includes bounding shape 502 around virtual instance 208 as well as bounding shapes 306, 308, 310, 312, and 314, of other objects in real-world image 302, may be used to update existing ground truth data. For example, existing ground truth data may include real-world image 302 and bounding shapes 306, 308, 310, 312, and 314. The ground truth data updater 112 may update the existing ground truth data to include inserted virtual instance 208 as well as bounding shape 502. The ground truth data may also be updated to include labels regarding the object, such as the virtual instance 208 being a deceased animal with a hazard rating of "high." Accordingly, when machine learning model(s) are trained using a training image of real-world image 302 augmented with virtual instance 204, corresponding ground truth data with the bounding shapes 306, 308, 310, 312, 314, and 502 and labels exists to evaluate the machine learning model(s) effectiveness.

Turning back to FIG. 1, dataset generator 114 may generate a new dataset and/or training image using real-word images augmented with virtual instances of an object. For instance, once the semantic augmentor 110 determines a virtual instance satisfies any required constraints to insert into a real-world image, the dataset generator 114 may generate a dataset to train a machine learning model by modifying the real-world image to include the satisfactory virtual instance. In some embodiments, the dataset generator 114 may generate datasets by removing bounding shapes from updated ground truth data that includes the real-world image augmented with the virtual instance.

Figure 6:
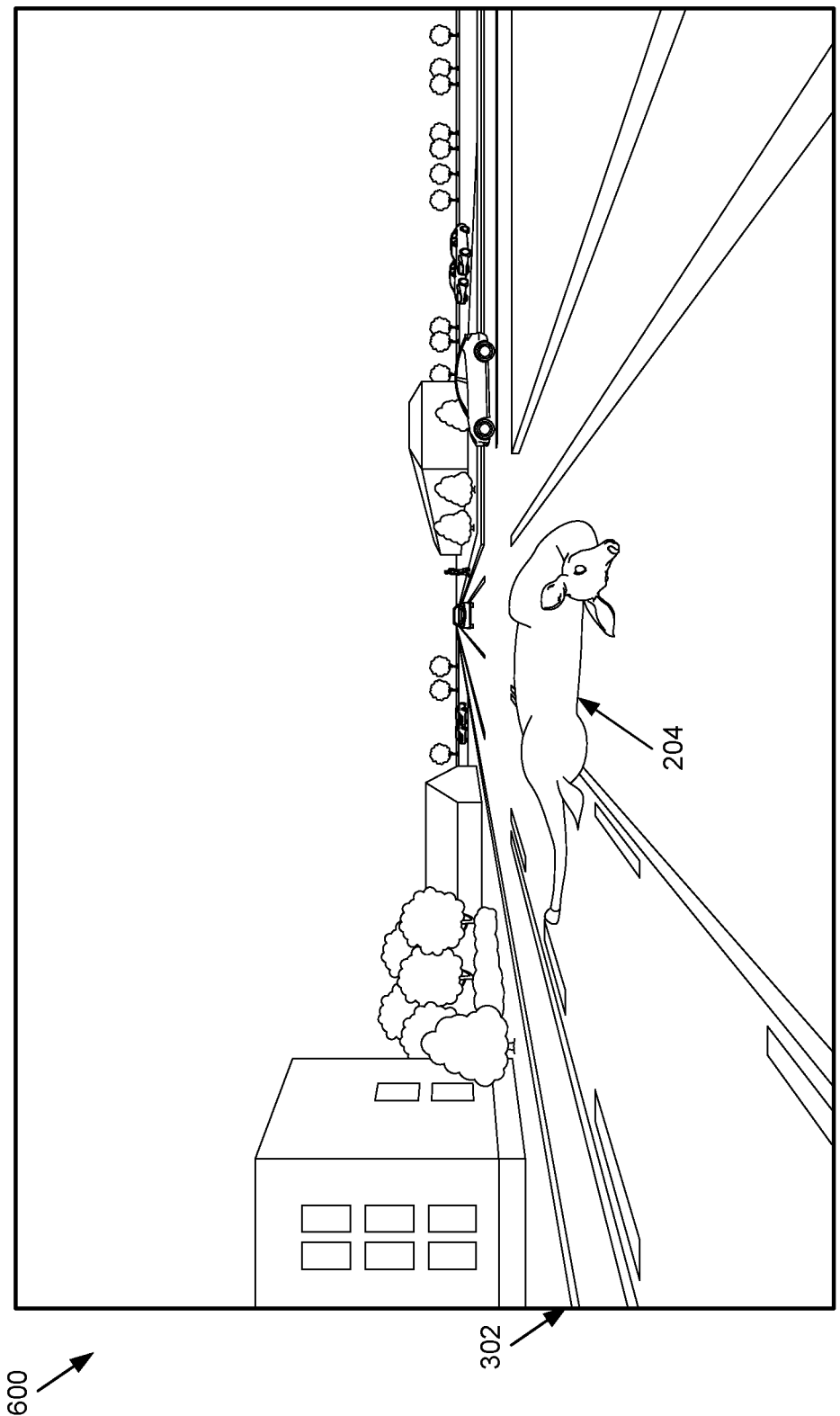
FIG. 6 is an example of a training image including a real-world image with an augmented simulated object that is used to train machine learning models, in accordance with some embodiments of the present disclosure.

Referring to FIG. 6, training image 600 is an example of a training image that includes a real-world image augmented with a representation of a simulated object that meets pre-set constraints, in accordance with some embodiments of the present disclosure. To generate training image 600, all of the ground truth annotations, such as bounding shapes 306, 308, 310, 312, 314, or 502, in visualization present in FIG. 5 have been removed. As shown in FIG. 6, training image 600 includes virtual instance 204 inserted into real-world image 302. Training image 600 may be used to train a machine learning model to detect road debris.

Turning back to FIG. 1, trainer 116 may use training images including real-world images augmented with virtual instances to train machine learning model(s). For example, the trainer 116 may receive training images, such as training image 600, provide it to machine learning model(s), and evaluate the model's outputs (e.g., bounding shapes around road debris, hazard ratings) by using corresponding ground truth data, such as visualization 500 in FIG. 5. The trainer 116 may then determine whether the model's output of a bounding shape and hazard rating matches the corresponding ground truth data and provide results to the machine learning model(s). In some embodiments, the trainer 116 may implement zero-shot training by inputting images with objects that were not present in prior training images to the machine learning model. In some embodiments, the trainer 116 evaluates the results of training using zero-shot training by determining whether the machine learning model identifies an object as road debris, even if the type of object (as identified by the machine learning model) is incorrect—e.g., even where the machine learning model was not trained to specifically classify that particular class or type of object.

Deployment module 118 may deploy a trained machine learning model to provide an autonomous vehicle 1000 with a mechanism to detect road debris. For instance, the deployment module 118 may deploy a trained machine learning model in an autonomous vehicle 1000 driving on a driving surface to detect whether an object is present on the driving surface. In some embodiments, the deployment module 118 may also deploy the machine learning model to detect object type (e.g., cardboard box, deceased animal, mattress), whether the object is a hazard, and a percentage confidence in the assessment that the object is a hazard.

The deployment module 118 may also deploy the model to be used in determining a next action. For instance, based on outputs of the model, the vehicle 1000 (e.g., a semi-autonomous or autonomous driving software stack) may determine whether to maneuver around an object, drive over the object, or come to a complete stop depending on object type, hazard rating, and/or percentage confidence. For example, the deployment module 118 may deploy the machine learning model(s) and receive an output of a bounding shape around an object on a driving surface and a hazard rating such as a small rectangle around a flattened cardboard box in the road and a hazard rating of "low." In response, the deployment module 118, via machine learning model(s), may determine that the next step is to drive over the flattened cardboard box versus stopping or maneuvering around the cardboard box. However, with objects that have larger bounding shapes and/or higher hazard ratings, such as a large, deceased animal or fallen construction materials that pose risks to drivers, the deployment module 118 may instead determine the responsive action is to bring the vehicle to a complete stop or to maneuver to the side of the dangerous objects.

Figure 7:
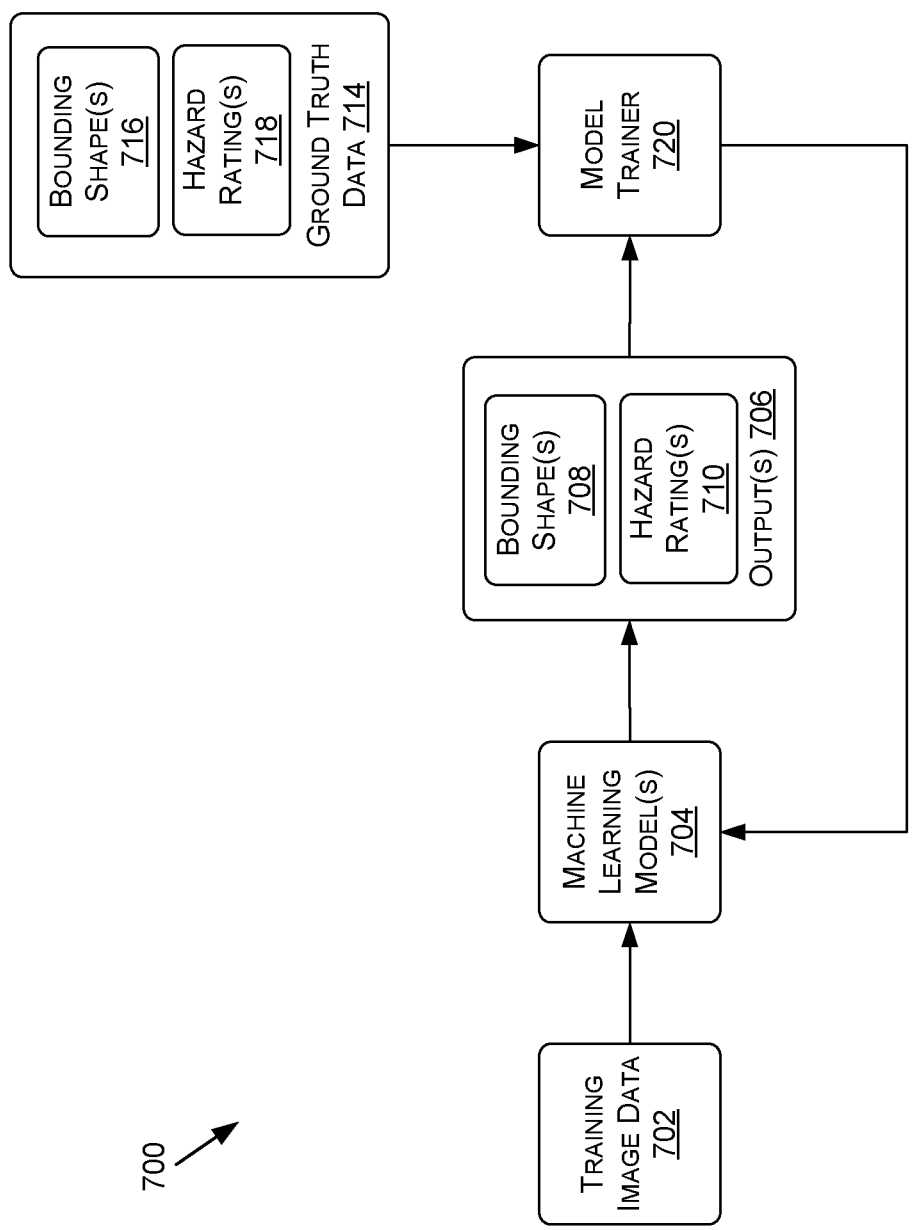
FIG. 7 is a data flow diagram illustrating an example process for training machine learning models to detect road debris using real-world images augmented with simulated objects and ground truth data including bounding shapes, in accordance with some embodiments of the present disclosure.

Now referring to FIG. 7, FIG. 7 is data flow diagram illustrating an example process 700 for training a machine learning model to detect road debris, in accordance with some embodiments of the present disclosure. Training image data 702 may include image data, such as real-world images augmented with simulated objects (e.g., road debris, road signs) that satisfy a set of constraints. As described herein, FIG. 1 describes the process of augmenting a real-world image with augmented objects and FIG. 6 is an example of a training image. The training image data 702 may also include images that contain objects that the machine learning model was not trained with. For example, the machine learning model may be previously trained with images containing cardboard boxes and deceased animals. The training image data 702, however, may also include images that have objects not present in the prior training images, such as construction cones and mattresses in order to implement zero-shot learning.

The machine learning model(s) 704 may use one or more images or other data representations (e.g., LIDAR data, RADAR data, etc.) as represented by the training image data 702 as input to generate the output(s) 706. In a non-limiting example, machine learning model(s) 704 may take one or more of: an image(s) represented by the training image data 702 (e.g., after pre-processing) as input to generate outputs 706, such as bounding shapes 708 and/or hazard ratings 710. Although examples are described herein with respect to using neural networks and specifically CNNs as the machine learning model(s) 704, this is not intended to be limiting. For example and without limitation, the machine learning model(s) 704 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The outputs 706 of the machine learning model(s) 704 may include the bounding shape(s) 708, hazard rating(s) 710, and/or other output types. In order to decode the outputs of the machine learning model(s) 704, in some non-limiting examples, GPU acceleration may be implemented. For example, a parallel processing platform (e.g., NVIDIA's CUDA) may be implemented to parallelize algorithms through several compute kernels for decoding the outputs—thereby decreasing run-time. In some embodiments, outputs 706 may include additional outputs such as an object type (e.g., deceased animal, construction materials) and a percentage confidence associated with each output.

The bounding shape(s) 708 may include a shape for each object in the training image data 702, where the shape encloses all pixels representing each respective object. The bounding shape(s) 708 may be any shape (e.g., square, rectangle, triangle, polygon) that captures and encloses pixels in a given object. For example, as described herein, FIG. 5 is an example visualization of bounding shape(s) 306, 308, 310, 312, 314, and 502 that enclose the pixels of a given object. In some embodiments, the bounding shape(s) 708 may be loosely or tightly fitted around the object to moderate the number of pixels outside of the object that are captured within the bounding shapes 708. As such, the machine learning model(s) 704 may compute, for each object in the training image data 702, an output of bounding shape(s) 708. Each bounding shape(s) 708 may also be accompanied by a percentage confidence value.

The hazard rating(s) 710 may include a rating of how hazardous each object in the training image data 702 is. The hazard rating(s) 710 may be a numerical value (e.g., scale of one to ten), hazard label (e.g., hazard or not), and/or relative value (e.g., low, medium, high) of the hazardous threat a particular object on the road poses. For instance, a large, deceased animal, such as moose, may receive hazard rating(s) 710 that indicates a higher level of danger than a flattened cardboard box. The hazard rating(s) 710 may also be accompanied by an object type label, which may be used to determine the level of hazardous threat an object poses. In some embodiments, when zero-shot learning is implemented, hazard rating(s) 710 may be calculated without regard to the type of object that is detected. For instance, assigning high hazard rating(s) 710 for a large rock may be more valuable for machine learning model(s) 704 to determine than for the machine learning model(s) to identify the object as a rock. Each hazard rating(s) 710 may be accompanied by a percentage confidence value.

Model trainer 720 may be a trainer for machine learning model(s) 704 that evaluates output(s) 706 against ground truth data 714, determines differences using one or more loss functions, and updates parameters (e.g., weights and biases) of the machine learning model 704 based on the results. Ground truth data 714 may include annotation data, such as bounding shape(s) 716 and hazard rating(s) 718 corresponding to real-world objects and/or simulated objects. For example, the ground truth data 714 may include annotations such as a rectangle around each object, a label describing an object type, and a label of whether each object is hazardous or not. As described herein, FIG. 5 is an example of a visualization of ground truth data corresponding to FIG. 6 that includes bounding shapes around each object on the road. Based on ground truth data 714 and output(s) 706, model trainer 720 may adjust the learning algorithm and training image data 702 to train machine learning model(s) 704 to formulate bounding shapes around each object on the road to more closely match ground truth data 714. Likewise, using ground truth data 714, model trainer 720 may also adjust the learning algorithm of machine learning model(s) 704 to more accurately label objects with object type and hazard rating(s) 710.

Figure 8:
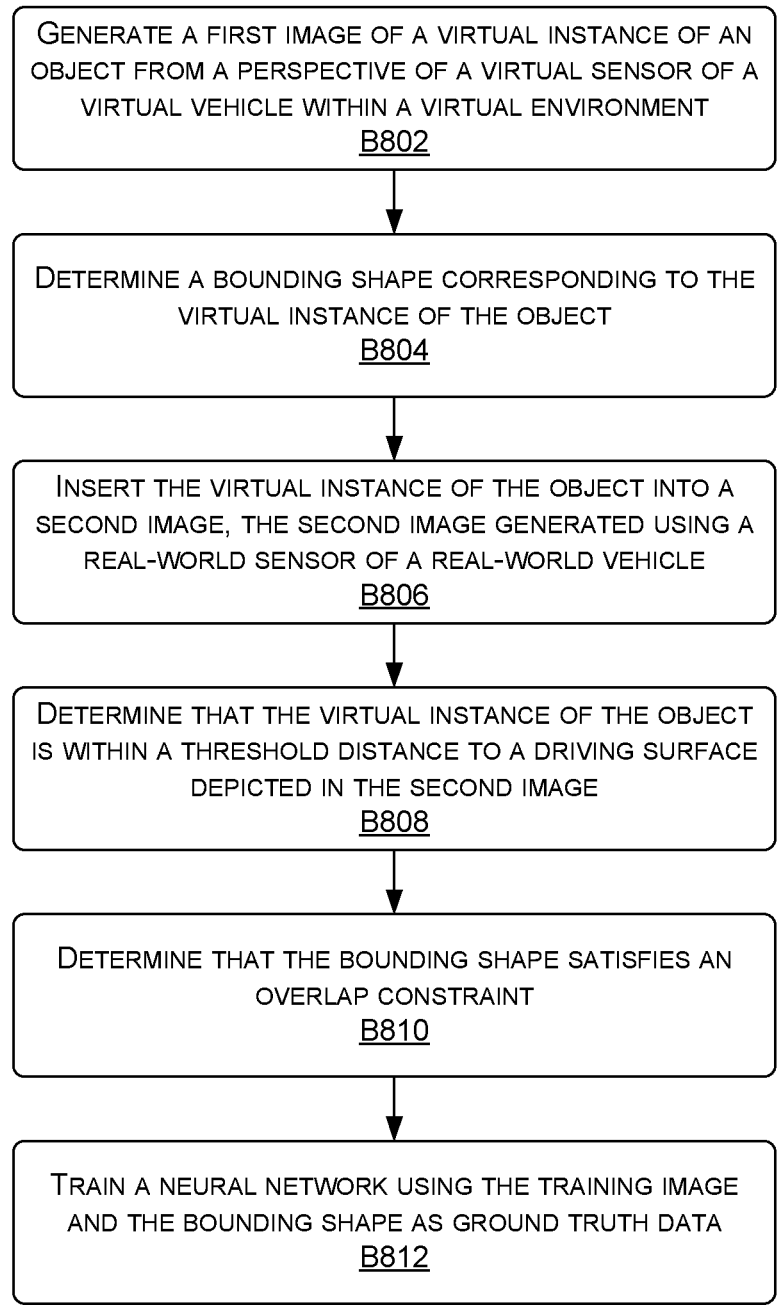
FIG. 8 is a flow diagram showing a method for generating training images to train a machine learning model to detect objects on a driving surface in an image, in accordance with some embodiments of the present disclosure.
Figure 9:
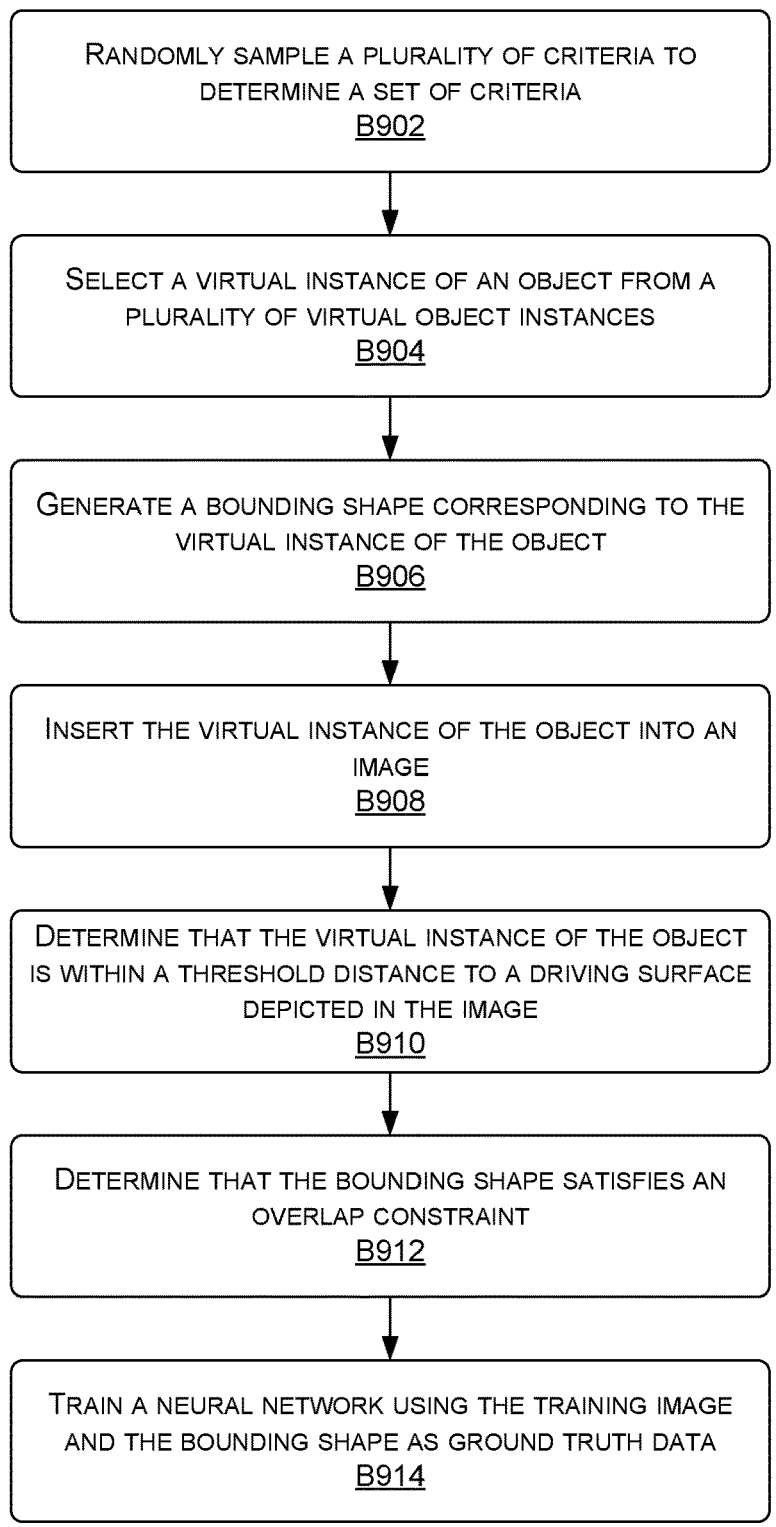
FIG. 9 is a flow diagram showing a method for generating training images with virtual objects that satisfy randomly selected criteria to train a machine learning model to detect objects on a driving surface in an image, in accordance with some embodiments of the present disclosure.

Now referring to FIGS. 8-9, each block of methods 800 and 900, described herein, comprises a computing process that may be performed using any combination of hardware, firmware, and/or software. For instance, various functions may be carried out by a processor executing instructions stored in memory. The methods 800 and 900 may also be embodied as computer-usable instructions stored on computer storage media. The methods 800 and 900 may be provided by a standalone application, a service or hosted service (standalone or in combination with another hosted service), or a plug-in to another product, to name a few. In addition, methods 800 and 900 are described, by way of example, with respect to the process 100 of FIG. 1. However, these methods may additionally or alternatively be executed by any one system, or any combination of systems, including, but not limited to, those described herein.

FIG. 8 is a flow diagram showing a method 800 for training a machine learning model to detect objects in an image using real-world images augmented with simulated objects, in accordance with some embodiments of the present disclosure. The method 800, at block B802, includes generating a first image of a virtual instance of an object from a perspective of a virtual sensor of a virtual vehicle within a virtual environment. For example, virtual instances 204, 206, and 208 of a deceased animal as shown in FIG. 2A may be generated via a game-based engine from the perspective of a virtual sensor mounted on the virtual vehicle in a simulated environment.

The method 800, at block B804, includes determining a bounding shape corresponding to the virtual instance of the object. For example, a bounding shape, such as bounding shape 304, corresponding to a virtual instance, such as virtual instance 206, may be created using segmentation mask 214 associated with virtual instance 206. In some embodiments, the bounding shape may be tightly or loosely fitted around the virtual instance.

The method 800, at block B806, includes inserting the virtual instance of the object into a second image, the second image generated using a real-world sensor of a real-world vehicle. For example, virtual instance 206 may be inserted into real-world image 302 that was captured using a real-world sensor mounted on a real-world vehicle.

The method 800, at block B808, includes determining that the virtual instance of the object is within a threshold distance to a driving surface depicted in the second image. For example, inserted virtual instance 206 in visualization 300 is checked to determine whether it satisfies a vertical distance threshold above the driving surface. Because the virtual instance 206 does not meet the vertical distance threshold, visualization 300 will not be used to train machine learning model(s). As shown in FIG. 4 and described herein, however, inserted virtual instance 204 satisfies both vertical and horizontal distance threshold constraints. Inserted virtual instance 208 in FIG. 5 similarly satisfies both of these distance threshold constraints as described herein.

The method 800, at block B810, includes determining that the bounding shape satisfies an overlap constraint. For example, bounding shape 402 around inserted virtual instance 204 is evaluated to determine whether the bounding shape meets an overlap constraint with bounding shapes around other objects on the driving surface. As shown in FIG. 4 and described herein, the bounding shape 402 overlaps with other bounding shapes 310, 312, and 314 and meets the conditions of the overlap constraint, causing the virtual instance 204 to be inserted into real-world image 302 to generate a training image. Bounding shape 502 around virtual instance 208 in FIG. 5 does not overlap with any of the bounding shapes 306, 308, 310, 312, and 314, and thus also meets the overlap constraint as described herein. Because bounding shape 502 and virtual instance 208 in visualization 500 meet both distance threshold and overlap constraints, real-world image 302 augmented with virtual instance 208 may be used to train machine learning model(s).

The method 800, at block B812, includes training a neural network using the training image and the bounding shape as ground truth data. For instance, the training image data 702 and ground truth data 714 with bounding shapes 716 and hazard ratings 718 may be used to train the machine learning model(s) 704, where the machine learning model(s) 704 may include a neural network (e.g., a CNN), in some examples. For example, FIG. 6, which includes real-world image 302 and virtual instance 208 that meets all required constraints may be used as training image data 702. Likewise, visualization 500 may be used as corresponding ground truth data 714 to evaluate the machine learning model(s).

With reference to FIG. 9, FIG. 9 is a flow diagram showing a method 900 for training a machine learning model to detect objects in an image using real-world images augmented with simulated objects generated with a set of criteria, in accordance with some embodiments of the present disclosure. The method 900, at block B902, includes randomly sampling a plurality of criteria to determine a set of criteria. For instance, criteria such as object types, location, lighting, orientation, pose, environmental conditions, and/or appearance attributes may be randomly selected. The values of each of these criteria may then be randomly selected as well. For example, a set of criteria, such as weather and object type, may be randomly selected and its values, such as fog and cardboard box, respectively, may also be randomly selected.

The method 900, at block B904, includes selecting a virtual instance of an object from a plurality of virtual object instances. For instance, a set of virtual instances of the object may be generated by a game-based engine, where each virtual instance incrementally has a value of a given criteria. For example, FIG. 2A includes virtual instances 204, 206, and 208, which are of the same object type, but each have a different position in a virtual environment. From the plurality of virtual instances, those that match (or closely match) the randomly sampled criteria may be selected to insert into a real-world image. In some embodiments, virtual instances may be selected, in part, based on conditions present in a real-world image.

The method 900, at block B906, includes generating a bounding shape corresponding to the virtual instance of the object. For example, a virtual instance 206 that meets the randomly sampled criteria may be selected to use for augmenting a real-world image 302. Bounding shape 304, which corresponds to virtual instance 206 may be generated based on segmentation mask 214. The bounding shape 304 is generated to capture all of the pixels that represent virtual instance 206 and may be tightly or loosely fitted around the virtual instance 206. Similarly, virtual instances 204 and 208 have bounding shapes 402 and 502, respectively.

The method 900, at block B908, includes inserting the virtual instance of the object into an image. For example, virtual instances 204, 206, and 208 are inserted into real-world image 302 as shown in FIGS. 3-5 and described herein.

The method 900, at block B910, includes determining that the virtual instance of the object is within a threshold distance to a driving surface depicted in the second image. For example, inserted virtual instances 204, 206, and 208 are evaluated to determine whether each virtual instance satisfies vertical and horizontal distance threshold constraints. As shown in FIG. 3 and described herein, virtual instance 206 (and its bounding shape 304) does not meet the vertical distance threshold. As shown in FIGS. 4 and 5 and described herein, virtual instances 204 and 208 (and their bounding shapes 402 and 502) satisfy both vertical and horizontal distance threshold constraints.

The method 900, at block B912, includes determining that the bounding shape satisfies an overlap constraint. For instance, the bounding shape of each virtual instance is evaluated to determine whether the given bounding shape satisfies the overlap constraint. As shown in FIG. 5 and described herein, virtual instance 208 satisfies the overlap constraint because the bounding shape 502 does not overlap with the bounding shapes 306, 308, 310, 312, and 314 of the other objects in the real-world image 302. Virtual instance 208 and bounding shape 502 are the only examples, however, that satisfy both distance threshold and overlap constraints.

The method 900, at block B914, includes training a neural network using the training image and the bounding shape as ground truth data. For example, visualization 500, which includes bounding shape 502, and training image 600, which includes real-world image 302 augmented with virtual instance 208, are used to train the neural network. For instance, the training image data 702 and ground truth data 714 with bounding shapes 716 and hazard ratings 718 may be used to train the machine learning model(s) 704, where the machine learning model(s) 704 may include a neural network (e.g., a CNN), in some examples.

Example Autonomous Vehicle

Figure 10A:
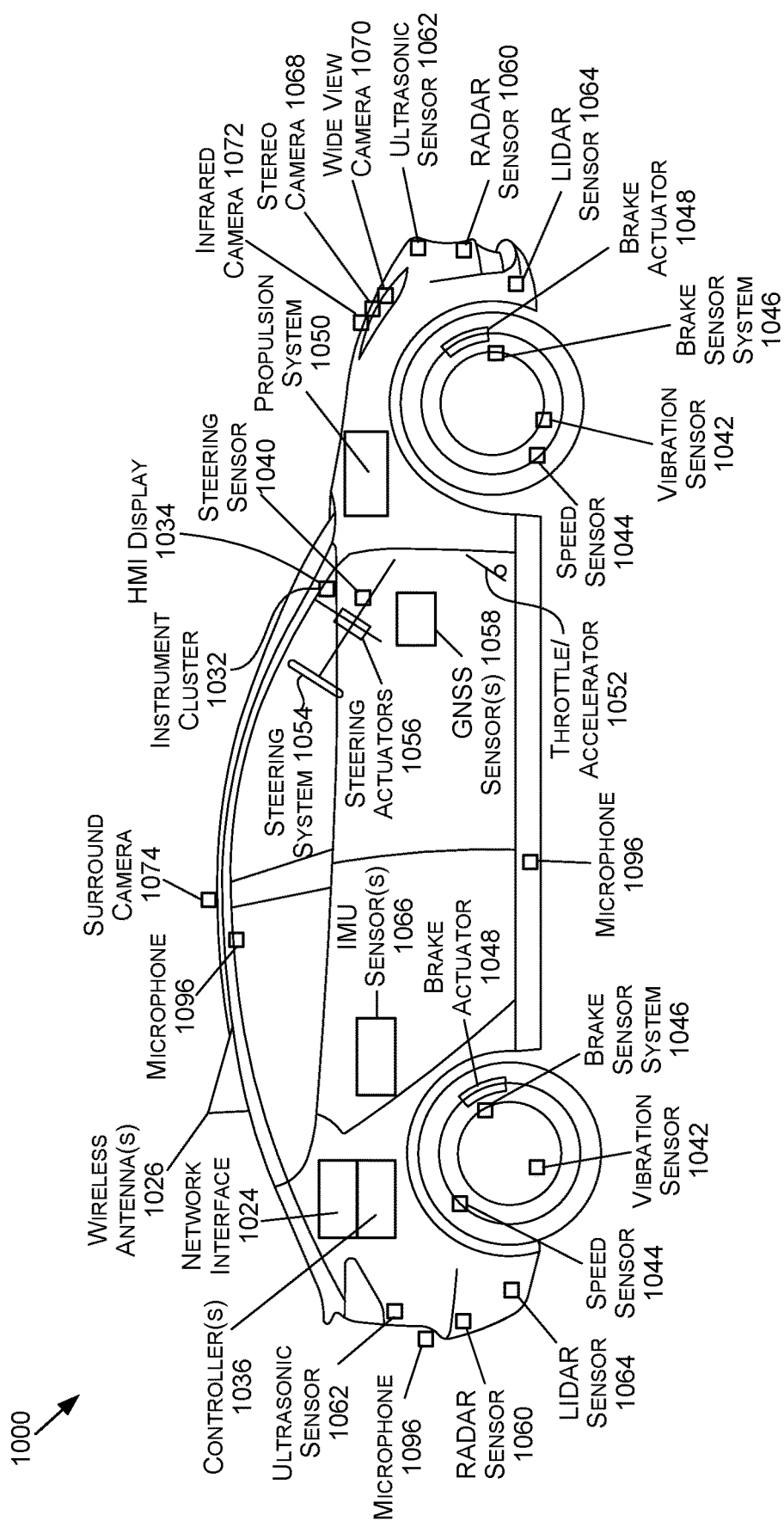
FIG. 10A is an illustration of an example autonomous vehicle, in accordance with some embodiments of the present disclosure.

FIG. 10A is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. For example, the vehicle 1000 may be capable of conditional automation (Level 3), high automation (Level 4), and/or full automation (Level 5), depending on the embodiment.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof. In some embodiments, the controller(s) 1036 may send signals to activate the vehicle brakes using brake actuators 1048 in response to a detected object on a driving surface that has a high hazard rating and is unavoidable.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the HD map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.). The controllers(s) 1036 may also receive outputs from machine learning model(s) regarding an action (e.g., drive over or maneuver around the object or come to a complete stop) to implement in response to a detected object on a driving surface.

The vehicle 1000 further includes a network interface 1024 which may use one or more wireless antenna(s) 1026 and/or modem(s) to communicate over one or more networks. For example, the network interface 1024 may be capable of communication over LTE, WCDMA, UMTS, GSM, CDMA2000, etc. The wireless antenna(s) 1026 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 10B:
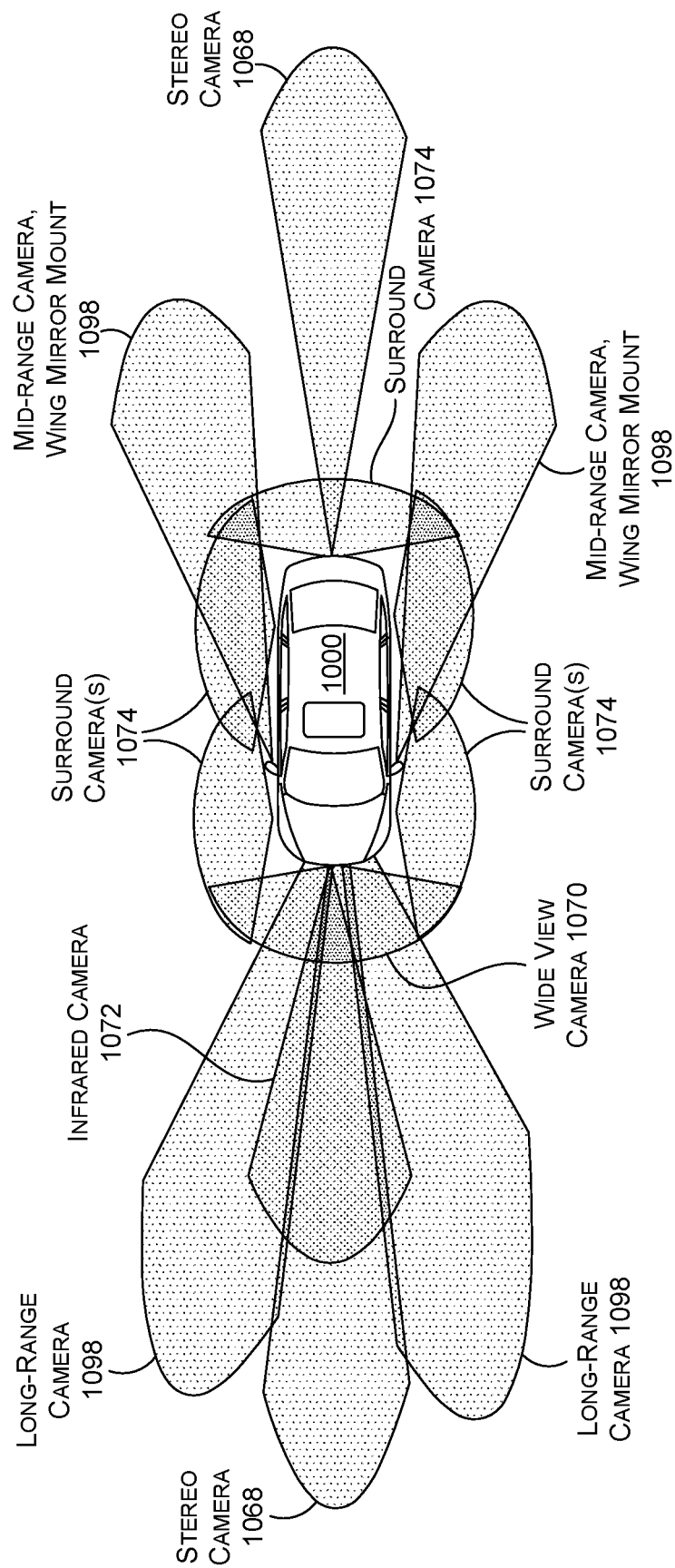
FIG. 10B is an example of camera locations and fields of view for the example autonomous vehicle of FIG. 10A, in accordance with some embodiments of the present disclosure.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red clear blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may any number of wide-view cameras 1070 on the vehicle 1000. In addition, long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

One or more stereo cameras 1068 may also be included in a front-facing configuration. The stereo camera(s) 1068 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Figure 10C:
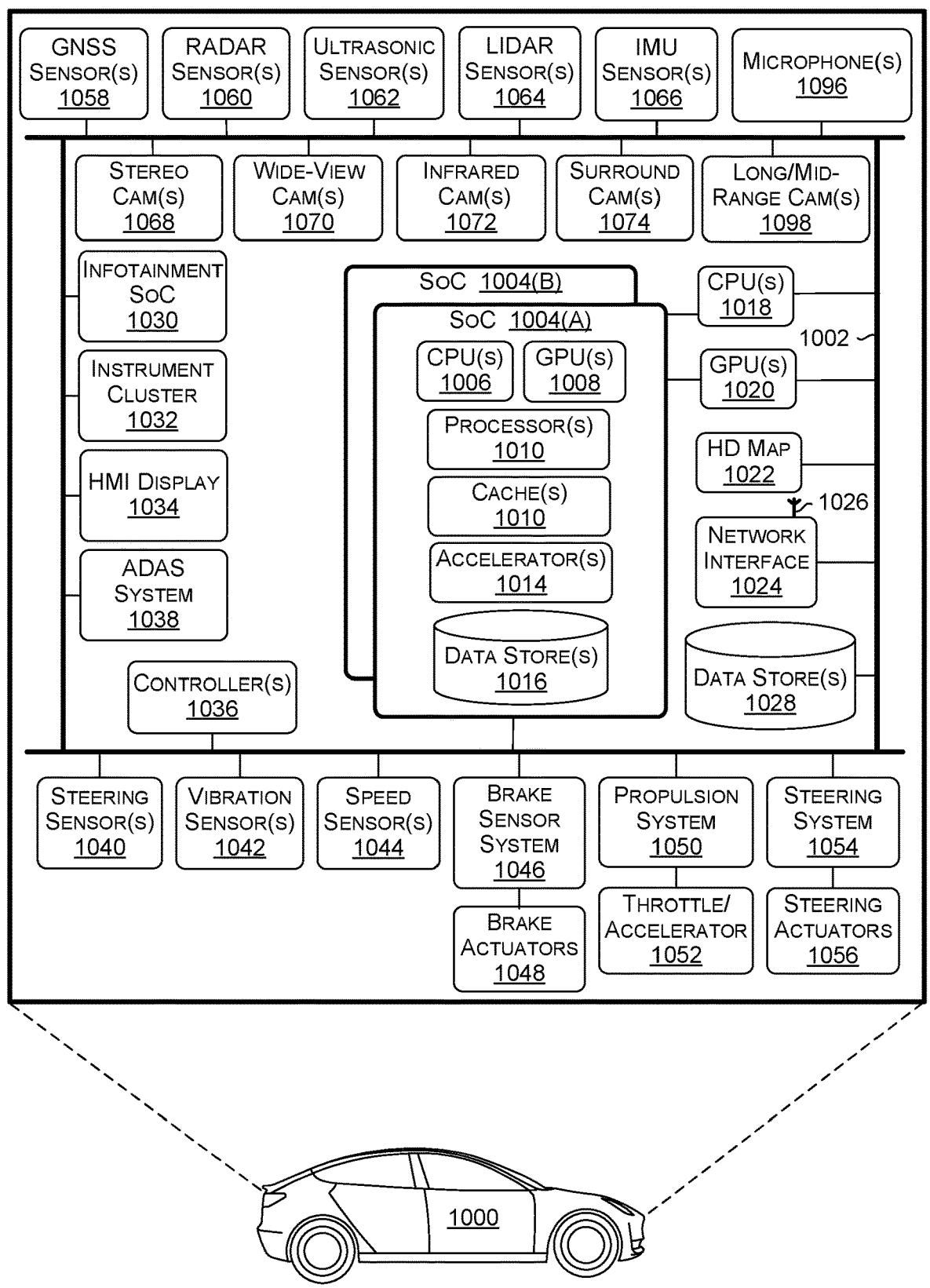
FIG. 10C is a block diagram of an example system architecture for the example autonomous vehicle of FIG. 10A, in accordance with some embodiments of the present disclosure.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like. As described herein, the controller(s) 1036 may determine adjustments to the position of vehicle 1000 to avoid or overcome objects detected on a driving surface.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events. The DLA(s) may also execute neural networks to determine a hazard rating for a detected piece of road debris and confidence percentages for all outputs of the neural networks.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas

1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1000 m, with an accuracy of 2 cm-3 cm, and with support for a 1000 Mbps Ethernet connection, for example. In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000.

Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

Figure 10D:
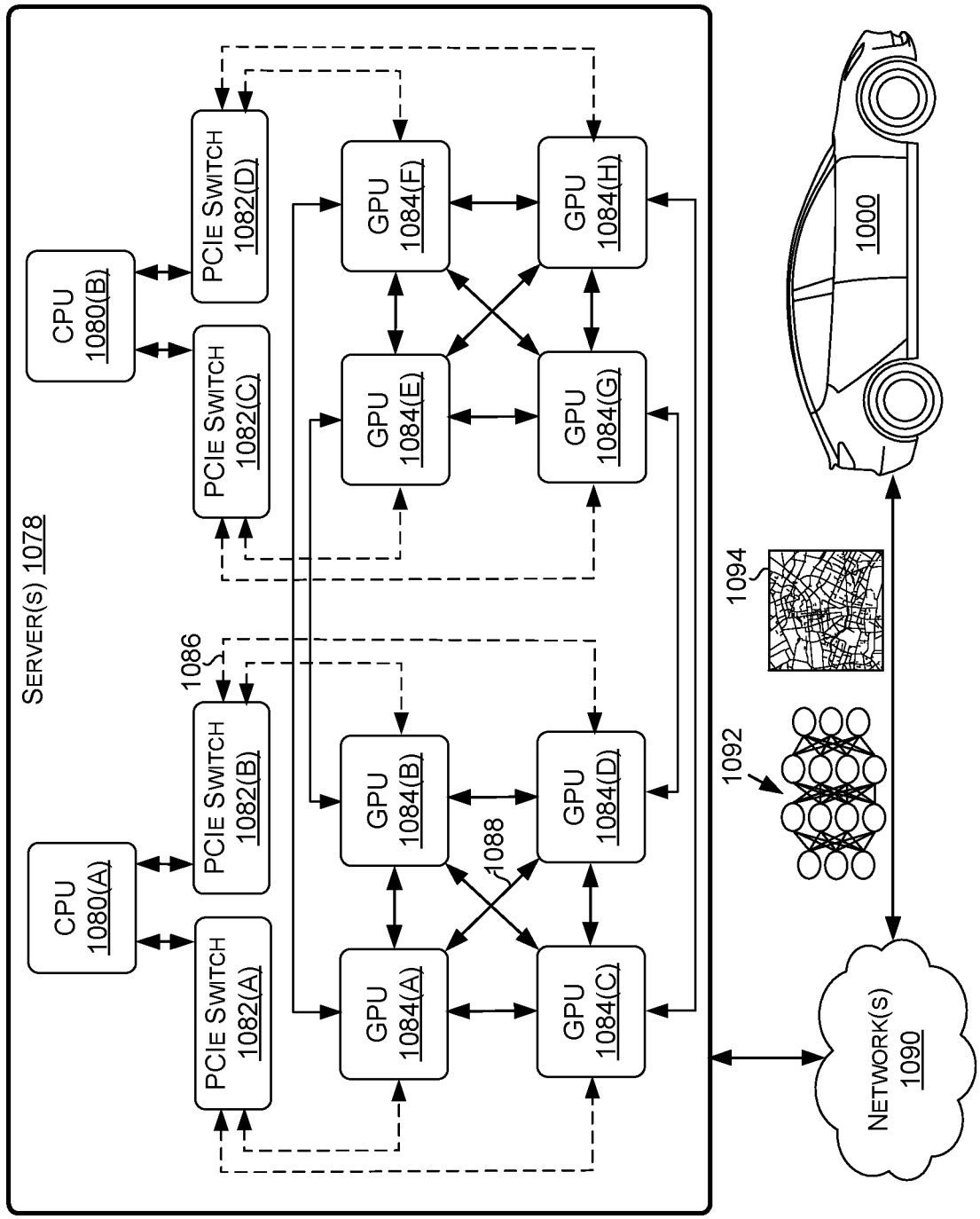
FIG. 10D is a system diagram for communication between cloud-based server(s) and the example autonomous vehicle of FIG. 10A, in accordance with some embodiments of the present disclosure.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 11:
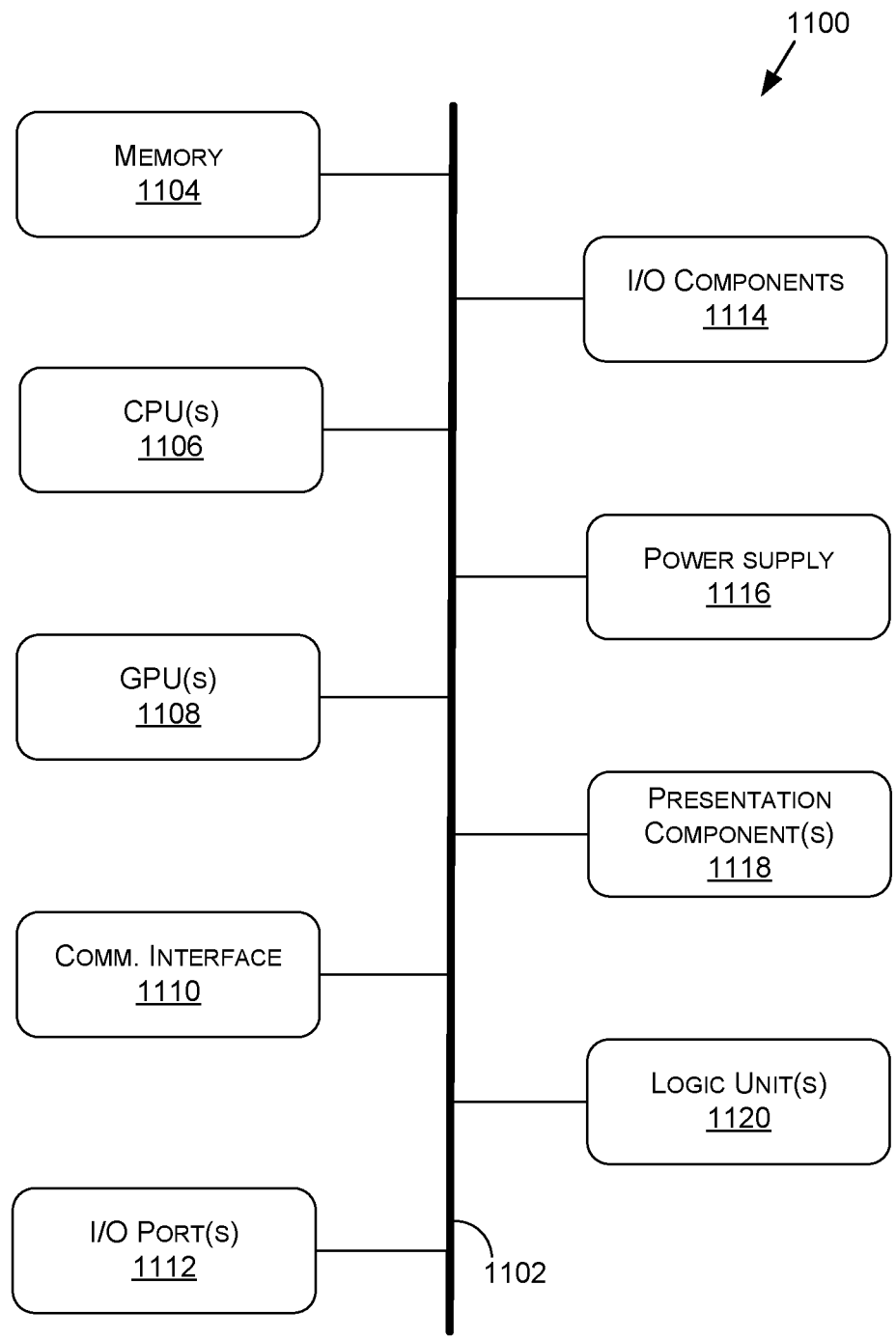
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, etc.), and output the data (e.g., as an image, video, sound, etc.).

Example Data Center

Figure 12:
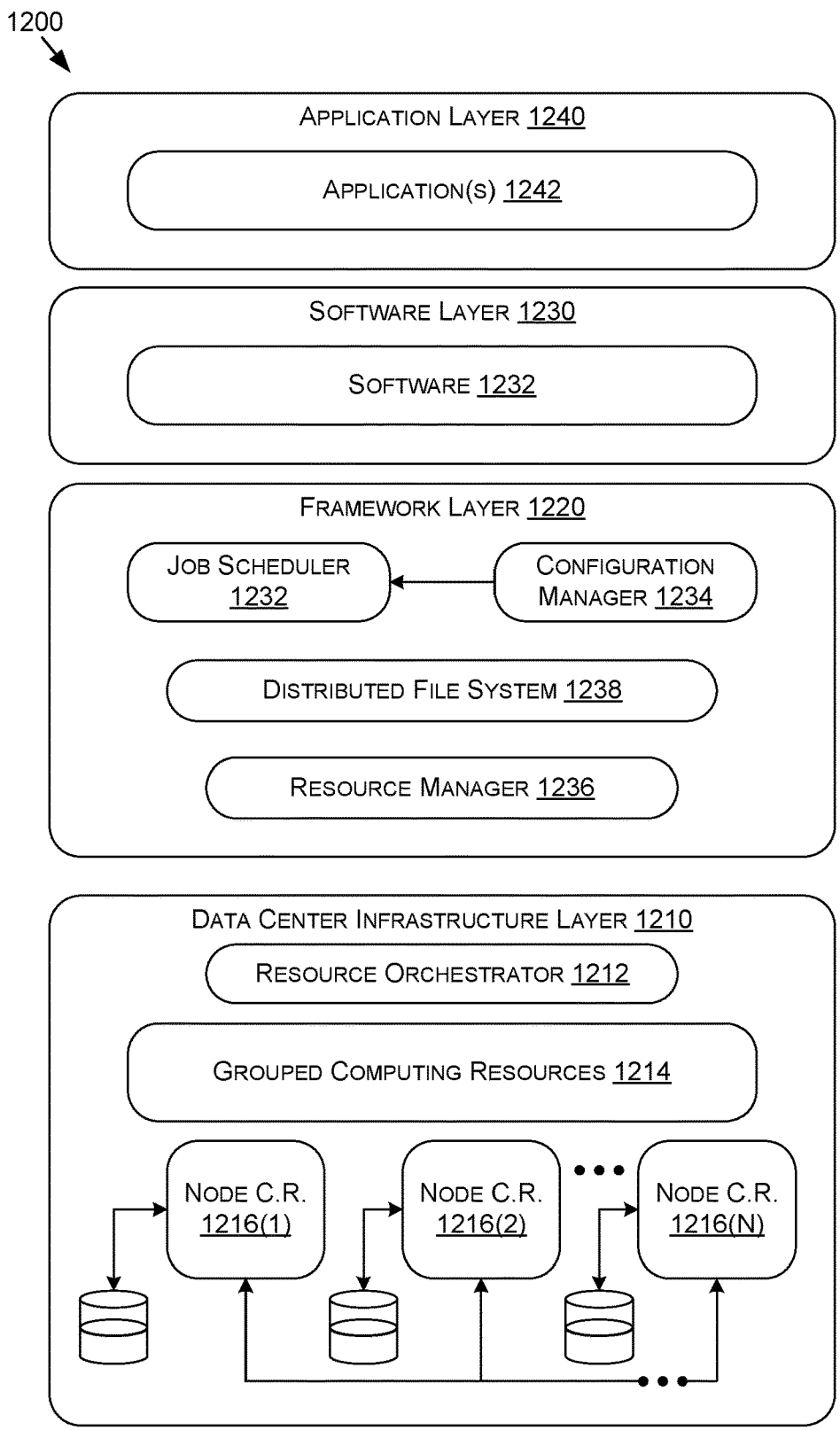
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161(N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1222 may configure or otherwise control one or more node C.R.s 1216(1)-1216(N) and/or grouped computing resources 1214. In at least one embodiment, resource orchestrator 1222 may include a software design infrastructure ("SDI") management entity for the data center 1200. The resource orchestrator 1222 may include hardware, software, or some combination thereof.

In at least one embodiment, as shown in FIG. 12, framework layer 1220 may include a job scheduler 1232, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1232 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1232. In at least one embodiment, clustered or grouped computing resources may include grouped computing resource 1214 at data center infrastructure layer 1210. The resource manager 1036 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216(1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
    processing circuitry to execute a neural network, the neural network trained, at least in part, using a training image and a bounding shape corresponding to the training image as ground truth data, the training image and the bounding shape generated, at least in part, by:
        generating a first image that includes a simulated object from a perspective of a virtual sensor of a virtual vehicle within a virtual environment;
        generating a segmentation mask corresponding to the first image;
        identifying, using the segmentation mask, pixels corresponding to a representation of the simulated object in the first image;
        forming the bounding shape corresponding to the simulated object around the pixels identified using the segmentation mask; and
        generating the training image at least in part by inserting the representation of the simulated object into a second image using the pixels identified using the segmentation mask, the second image generated using a real-world sensor of a real-world vehicle.

2. The processor of claim 1, wherein the neural network is further trained, at least in part, by:
    populating, within the virtual environment, a plurality of representations of the simulated object, wherein:
        the plurality of representations are generated using a game engine and are depicted in the first image; and
        each representation of the plurality of representations corresponds to at least one of a different location, different orientation, different appearance attribute, a different set of lighting conditions, a different set of occlusion conditions, or a different environmental condition.

3. The processor of claim 2, wherein the neural network is further trained, at least in part, by:
    randomly sampling a set of criteria;
    searching the plurality of representations using the set of criteria based at least on the sampling; and
    selecting the representation from the plurality of representations for insertion into the second image based at least on the searching indicating the representation partially matches the set of criteria.

4. The processor of claim 1, wherein the generating the training image further includes determining that a position corresponding to the representation of the simulated object is within a threshold vertical distance from a driving surface depicted in the second image.

5. The processor of claim 1, wherein the neural network is trained using zero-shot learning.

6. The processor of claim 1, wherein the generating the training image further includes determining that first pixels within the bounding shape are not overlapping second pixels based at least on the second pixels corresponding to a real-world object included in the ground truth data and captured using the real-world sensor.

7. The processor of claim 1, wherein the executing the neural network includes:
computing, using the neural network and based at least on a third image generated using a sensor of an autonomous machine, data indicative of one or more bounding shapes corresponding to one or more objects depicted in the third image.

8. The processor of claim 7, wherein the executing the neural network further includes:
computing, using the neural network and based at least in part on the third image, data indicative of a classification of the one or more objects.

9. The processor of claim 1, wherein the inserting the representation of the simulated object into the second image includes:
determining a pose of the representation of the simulated object relative to the virtual sensor; and
inserting the representation of the simulated object into the second image at the pose relative of the real-world sensor based at least on adjusting the representation of the simulated object.

10. The processor of claim 1, wherein the processing circuitry further performs one or more operations based at least on one or more outputs of the neural network generated during the executing the neural network.

11. A method comprising:
generating a first image that includes a simulated object within a virtual environment;
identifying, using a segmentation mask corresponding to the first image, pixels corresponding to a representation of the simulated object in the first image;
generating a bounding shape around the pixels identified using the segmentation mask;
generating a training image at least in part by augmenting a second image with the representation of the simulated object using the pixels identified using the segmentation mask;
and
training a neural network using the training image and the bounding shape.

12. The method of claim 11, further comprising:
randomly sampling a set of criteria;
searching a plurality of representations of simulated objects using the set of criteria based at least on the sampling; and
selecting the representation from the plurality of representations for insertion into the second image based at least on the searching indicating the representation partially matches the set of criteria.

13. The method of claim 12, wherein the segmentation mask identifies at least two representations of the plurality of representations in the first image.

14. The method of claim 12, wherein the plurality of representations are generated using a game engine and based at least on the set of criteria.

15. The method of claim 11, wherein the neural network is trained using zero-shot learning.

16. A system comprising:
one or more processing units to execute operations comprising:
generating a first image that includes a representation of a simulated object from a perspective of a virtual sensor of a virtual vehicle within a virtual environment;
identifying, using a segmentation mask corresponding to the first image, pixels corresponding to the representation of the simulated object in the first image;
generating a bounding shape around the pixels identified using the segmentation mask;
generating a training image at least in part by inserting the representation of the simulated object into a second image using the pixels identified using the segmentation mask, the second image generated using a real-world sensor of a real-world vehicle;
training a neural network using the training image and the bounding shape.

17. The system of claim 16, the operations further comprising:
populating, within the virtual environment, a plurality of representations of the simulated object, wherein:
the plurality of representations are generated using a game engine; and
each representation of the plurality of representations corresponds to at least one of a different location, different orientation, different appearance attribute, a different lighting condition, a different occlusion condition, or a different environmental condition.

18. The system of claim 17, wherein the segmentation mask identifies at least two representations of the plurality of representations.

19. The system of claim 16, wherein the generating the training image includes at least one of:
determining that a position corresponding to the representation of the simulated object is within a threshold vertical distance from a driving surface depicted in the first image; or
determining that a position corresponding to the representation of the simulated object is within a threshold horizontal distance of one or more boundaries of the driving surface.

20. The system of claim 16, wherein the generating the training image includes determining that first pixels within the bounding shape are not included within second pixels determined from ground truth data.

21. The system of claim 16, wherein the system is comprised in at least one of:
a system for performing simulation operations;
a system for performing deep learning operations;
a system implemented using an edge device;
a system incorporating one or more virtual machines (VMs);
a system implemented at least partially in a data center; or
a system implemented at least partially using cloud computing resources.

* * * * *